US008195464B2

(12) United States Patent
Morita et al.

(10) Patent No.: US 8,195,464 B2
(45) Date of Patent: Jun. 5, 2012

(54) SPEECH PROCESSING APPARATUS AND PROGRAM

(75) Inventors: Masahiro Morita, Yokohama (JP); Takehiko Kagoshima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 911 days.

(21) Appl. No.: 12/212,759

(22) Filed: Sep. 18, 2008

(65) Prior Publication Data

US 2009/0177474 A1 Jul. 9, 2009

(30) Foreign Application Priority Data

Jan. 9, 2008 (JP) ................................ 2008-002305

(51) Int. Cl.
*G01L 13/00* (2006.01)

(52) U.S. Cl. ........ 704/265; 704/258; 704/260; 704/267; 704/268

(58) Field of Classification Search ........................ None
See application file for complete search history.

(56) References Cited

U.S. PATENT DOCUMENTS

| | | | | |
|---|---|---|---|---|
| 5,369,730 A * | 11/1994 | Yajima | 704/267 |
| 6,553,343 B1 * | 4/2003 | Kagoshima et al. | 704/262 |
| 6,697,780 B1 * | 2/2004 | Beutnagel et al. | 704/258 |
| 6,912,495 B2 * | 6/2005 | Griffin et al. | 704/208 |
| 7,856,357 B2 * | 12/2010 | Mizutani et al. | 704/261 |
| 8,010,347 B2 * | 8/2011 | Ricci et al. | 704/201 |
| 2003/0009336 A1 | 1/2003 | Kenmochi et al. | |
| 2005/0137870 A1 | 6/2005 | Mizutani et al. | |

FOREIGN PATENT DOCUMENTS

| | | |
|---|---|---|
| EP | 421531 A2 * | 4/1991 |
| JP | 2001-282278 | 10/2001 |
| JP | 2002-202790 | 7/2002 |
| JP | 2005-164749 | 6/2005 |

OTHER PUBLICATIONS

Stylianou, "Concatenative Speech Synthesis using a Harmonic plus Noise Model", The 3rd ESCA/COCOSDA Workshop on Speech Synthesis, 1998.*

Yegnanarayana et al., "An Iterative Algorithm for Decomposition of Speech Signals into Periodic and Aperiodic Components", IEEE Transactions on Speech and Audio Processing, vol. 6, No. 1, Jan. 1998.* d'Alessandro et al., "Effectiveness of a Periodic and Aperiodic Decomposition Method for Analysis of Voice Sources", IEEE Transactions on Speech and Audio Processing, vol. 6, No. 1, Jan. 1998.*

Japanese Office Action for Application No. 2008-002305 mailed on Feb. 7, 2012.

Kagoshima, Takehiko; "ToSpeak High-Quality Text-to-Speech System", Toshiba Review, vol. 62, No. 12 (2007), pp. 34-37.

* cited by examiner

*Primary Examiner* — Brian Albertalli
(74) *Attorney, Agent, or Firm* — Turocy & Watson, LLP

(57) ABSTRACT

A speech synthesizer includes a periodic component fusing unit and an aperiodic component fusing unit, and fuses periodic components and aperiodic components of a plurality of speech units for each segment, which are selected by a unit selector, by a periodic component fusing unit and an aperiodic component fusing unit, respectively. The speech synthesizer is further provided with an adder, so that the adder adds, edits, and concatenates the periodic components and the aperiodic components of the fused speech units to generate a speech waveform.

21 Claims, 19 Drawing Sheets

FIG. 4

43

| UNIT ID | PHONEMES | CURRENT PHONEMEADJACENT PHONEMES (TWO PHONEMES EACH IN FRONT AND BACK) | FUNDAMENTAL FREQUENCY | PHONOLOGICAL DURATION | COEFFICIENTS OF CEPSTRUM START END | COEFFICIENTS OF CEPSTRUM TERMINAL END |
|---|---|---|---|---|---|---|
| ⋮ | ⋮ | ⋮ | ⋮ | ⋮ | ⋮ | ⋮ |
| 100 | /a/ | /-//k/, /i//m/ | 221Hz | 83msec | 2.54, 0.24, ... | 2.49, 0.18, ... |
| 101 | /a/ | /a//m/, /k//e/ | 296Hz | 125msec | 2.33, 0.28, ... | 2.55, 0.22, ... |
| 102 | /i/ | /o//k/, /r//u/ | 240Hz | 61msec | 2.54, -0. 35, ... | 2.23, 0.02, ... |
| ⋮ | ⋮ | ⋮ | ⋮ | ⋮ | ⋮ | ⋮ |

SPEECH PROCESSING APPARATUS AND PROGRAM

CROSS-REFERENCE TO RELATED APPLICATIONS

This application is based upon and claims the benefit of priority from the prior Japanese Patent Application No. 2008-2305, filed on Jan. 9, 2008; the entire contents of which are incorporated herein by reference.

TECHNICAL FIELD

The present invention relates to a speech processing apparatus configured to carry out a text-to-speech synthesis and a program therefor, and a speech processing apparatus configured to create a storage for storing a plurality of speech units used for text-to-speech synthesis and a program therefor.

BACKGROUND OF THE INVENTION

To create a speech signal artificially from a given sentence is referred to as "text-to-speech synthesis". The text-to-speech synthesis is carried out generally by three units; a text processing unit configured to carry out text-normalization, morphological analysis (tokenization and POS tagging), or syntactic analysis of an entered text, a prosodic processing unit configured to predict appropriate intonation, rhythm, etc., based on text processing results and output phonological sequence plus prosodic information (fundamental frequency, phonological/segmental duration, power, etc.), and a speech synthesizer configured to synthesize speech signals from the phonological sequence and prosodic information. In a method of speech synthesis, which is carried out in the speech synthesizer among these units, it is necessary to carry out a speech synthesis for a given phonological sequence with a given prosody generated in the prosodic processing unit.

As an example of the method of speech synthesis, a unit-selection type method is well-known (for example, see JP-A-2001-282278 (Kokai), hereinafter referred to as Patent Document 1). In this method, first, a sequence of speech units is selected from a large quantity of speech units stored in advance, referring to the input phonological sequence/prosodic information as a target for each of a plurality of segments (synthetic unit sequence), which are obtained by dividing the input phonological sequence, and then a speech waveform is synthesized by concatenating the sequence of selected speech units.

In the method of speech synthesis disclosed in Patent Document 1, a cost which indicates the degree of deterioration of the synthetic speech caused during synthesis process is defined by a function called "cost function", and the speech units are selected so that the cost is minimized. For example, distortion caused by editing speech-units and distortion caused by concatenating them are estimated using the cost, and the speech unit sequence used for the speech synthesis is selected on the basis of the cost, and the synthesized speech is generated on the basis of the selected speech unit sequence.

As in the method of speech synthesis disclosed in Patent Document 1, deterioration of speech quality in the synthetic speech caused by editing and concatenating the units can be restrained by selecting an adequate speech unit sequence from a large quantity of speech unit considering the degree of deterioration caused by synthesizing the speech.

However, the unit-selection type method of speech synthesis disclosed in Patent Document 1 has a problem that the speech quality of the synthesized speech is partly deteriorated.

The reasons are as follows.

The first reason is that even though a huge number of speech units are stored in advance, speech units adequate for various phonological/prosodic environments do not necessarily exist.

The second reason is that the degree of deterioration of the synthesized speech that people actually feels cannot be represented perfectly by the cost function, and hence the optimal unit sequence cannot necessarily be selected.

The third reason is that since the number of the speech units is very large, it is difficult to exclude defective speech units in advance and the cost function for removing such defective speech units is also difficult to design, so such defective speech units may be mixed sometimes in the selected speech unit sequence.

Therefore, instead of selecting a single speech unit per a single segment, another method that selects a plurality of speech units per a single segment, fusing these speech units to generate a new speech unit for each segment and, synthesizing the speech waveform using the generated new speech units is disclosed (JP-A-2005-164749 (Kokai), hereinafter, referred to as Patent Document 2). Hereinafter, this method is referred to as a "multiple unit selection and fusion type method of speech synthesis".

In the multiple unit selection and fusion type method of speech synthesis disclosed in Patent Document 2, high-quality new speech units are generated by fusing the plurality of speech units per a single segment even when adequate speech units suitable for the target phonological/prosodic environment do not exist, when optimal speech units are not selected, or when defective units are selected, and the problems in the unit-selection type method of speech synthesis described above are improved and the speech synthesis with high speech quality having higher stability is realized by carrying out the speech synthesis using the newly generated speech units.

However, the method of fusing the speech units disclosed in Patent Document 2 is a method taking notice of specifically periodic components in the voiced sounds (periodic components) and aiming at averaging these components adequately.

Although main components of the voiced sound are periodic components since it is generated mainly from periodic pulses of vocal cord vibrations as a voice source, there are actually aperiodic components as well; one is generated by exciting the vocal tract with air turbulence occurring when aspirated air passes through a narrow point of vocal tract or the chink of the glottis, and another is caused by fluctuations in periodicity of the vocal cord vibrations. In particular, in the case of the voiced fricative, the aperiodic components are very important elements which determine the phonological property. As regards vowel, a husky voice or the voice of persons who speak with a breathy voice includes relatively large aperiodic components, which do not affect directly the phonological property, but are important elements which determine the speaker characteristic.

When the speech units of the actual voiced sound having the periodic components and aperiodic components (aperiodic components) mixed therein are fused in this manner, the aperiodic components which have no correlation between units are cancelled and attenuated, or the phase of the aperiodic components which should be random are partly aligned, so that problems such that the naturalness of speech may be impaired or noise may be generated.

In overlapping the fused speech units to generate the synthesized waveform, when the given target duration is longer than the duration of the speech unit, it is necessary to elongate the speech units by repeating some pitch-cycle waveforms in the speech unit. However, at this time, an unnatural periodicity is generated by the repeated aperiodic components contained in the pitch-cycle waveforms, and hence there arise problems of generation of a sense of buzziness and degradation of naturalness of the speech quality.

BRIEF SUMMARY OF THE INVENTION

In order to solve the above-described problems in the related art, it is an object of the invention to provide a speech synthesizing apparatus which is able to generate a synthesized speech providing a high naturalness of speech while maintaining the stability provided by the multiple unit selection and fusion type method of speech synthesis, and a program therefor.

According to embodiments of the present invention, there is provided a speech processing apparatus for carrying out text-to-speech synthesis including: an input unit to which a plurality of segments obtained by delimiting a phonological sequence corresponding to a target speech in units of synthesis and prosodic information on the respective segments corresponding to the target speech are entered; a unit selector configured to select a plurality of first speech units from a group of speech units on the basis of the prosodic information for each of the plurality of segments; a decomposer configured to decompose each of the plurality of first speech units into periodic components and aperiodic components for each of the plurality of segments; a periodic component fusing unit configured to generate a second speech unit by fusing the periodic components of the plurality of first speech units for each of the plurality of segments; an aperiodic component fusing unit configured to generate a third speech unit by fusing the aperiodic components of the plurality of first speech units for each of the plurality of segments; and a generator configured to generate a synthesized speech by adding speech waveforms obtained respectively from the second speech units and the third speech units generated for each of the plurality of segments and concatenating the same among the segments.

According to the embodiments of the invention, there is provided a speech processing apparatus for carrying out text-to-speech synthesis, including: an input unit to which a plurality of segments obtained by delimiting a phonological sequence corresponding to a target speech in units of synthesis and prosodic information on the respective segments corresponding to the target speech; an environment storage configured to store speech-units' environments of a plurality of speech units are entered; a unit storage configured to store periodic components and aperiodic components of each of the speech units; an environment selector configured to select the unit environments of a plurality of first speech units from the environment storage on the basis of the prosodic information for each of the plurality of segments; a periodic component fusing unit configured to extract the periodic components of the first speech units corresponding to the selected unit environments of the plurality of first speech units from the unit storage and fuse the periodic components individually to generate the second speech units for each of the plurality of segments; an aperiodic components configured to extract the aperiodic components of the first speech units corresponding to the unit environments of the plurality of first speech units from the unit storage and fuse the aperiodic components individually to generate a third speech unit for each of the plurality of segments; and a generator configured to generate a synthesized speech by adding speech waveforms obtained respectively from the second speech units and the third speech units of the plurality of segments and concatenating the same among the segments.

According to the embodiments of the invention, there is provided a speech processing apparatus for creating a storage for storing a plurality of speech units used for text-to-speech synthesis including: an input unit to which a plurality of segments obtained by delimiting a phonological sequence corresponding to a target speech in units of synthesis and prosodic information on the respective segments corresponding to the target speech are entered; a unit selector configured to select a plurality of first speech units from a group of the speech units on the basis of the prosodic information for each of the plurality of segments; a decomposer configured to decompose each of the plurality of first speech units into periodic components and aperiodic components for each of the plurality of segments; a periodic component fusing unit configured to generate a second speech unit by fusing the periodic components of the plurality of first speech units for each of the plurality of segments; an aperiodic component fusing unit configured to generate a third speech unit by fusing the aperiodic components of the plurality of first speech units for each of the plurality of segments; and a storage configured to store the plurality of second speech units and the plurality of third speech units.

According to the embodiments of the invention, there is provided a speech processing apparatus for creating a storage for storing a plurality of speech units used for text-to-speech synthesis including: a unit storage configured to store periodic components and aperiodic components of each of the speech units; an input unit to which a plurality of segments obtained by delimiting a phonological sequence corresponding to a target speech in units of synthesis and prosodic information on the respective segments corresponding to the target speech are entered; a component selector configured to select the periodic components and the aperiodic components of the plurality of first speech units from the unit storage on the basis of the prosodic information for each of the plurality of segments; a periodic component fusing unit configured to generate a second speech unit by fusing the periodic components of the plurality of first speech units for each of the plurality of segments; an aperiodic component fusing unit configured to generate a third speech unit by fusing the aperiodic components of the plurality of first speech units for each of the plurality of segments; and a storage configured to store the plurality of second speech units and the plurality of third speech units.

According to the embodiments of the invention, attenuation of the aperiodic components or generation of noise due to fusion and a sense of buzziness caused by the periodically repeated aperiodic components are improved, and a synthesized speech providing a high naturalness of speech is generated while maintaining the stability provided by the multiple unit selection and fusion type method of speech synthesis.

BRIEF DESCRIPTION OF THE DRAWINGS

FIG. 4 is a drawing showing an example of unit attribute information stored in a speech unit attribute information storage;

DETAILED DESCRIPTION OF THE INVENTION

Figure 1:
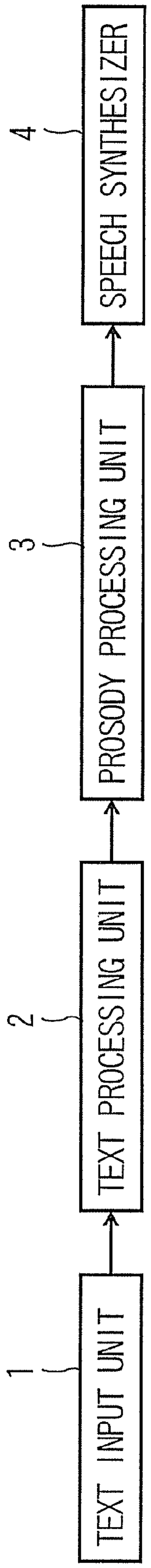
FIG. 1 is a block diagram showing a configuration of a synthesizing apparatus according to a first embodiment of the invention.

Referring now to the drawings, a text-to-speech synthesizing apparatus (hereinafter, referred simply to "synthesizing apparatus") according to the embodiments of the invention.

First Embodiment

Referring to FIG. 1 to FIG. 13, a synthesizing apparatus according to a first embodiment of the invention will be described.

(1) Configuration of Synthesizing Apparatus

Referring to FIG. 1, a configuration of the synthesizing apparatus will be described.

The synthesizing apparatus includes a text input unit 1, a text processing unit 2 configured to carry out text-normalization, morphological analysis, or syntactic analysis, of a text entered from the text input unit 1 and output the result of the text analysis to a prosodic processing unit 3, the prosodic processing unit 3 configured to predict appropriate intonation, rhythm, etc. from the result of text analysis, generate phonological sequence and prosodic information and output the same to a speech synthesizer, and a speech synthesizer 4 configured to generate a speech waveform from the phonological sequence and the prosodic information and output the same.

Subsequently, the configuration and operation of mainly the speech synthesizer 4 which is the most characteristic part of the first embodiment will be described in detail.

(2) Configuration of Speech Synthesizer 4

Figure 2:
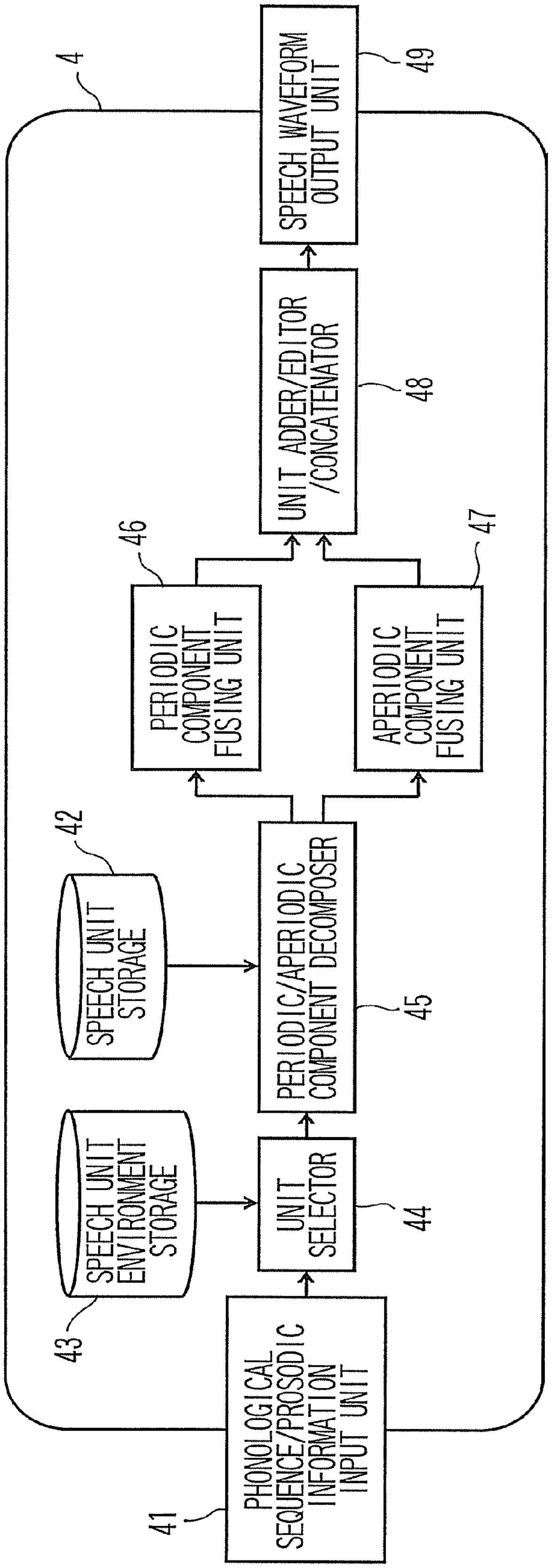
FIG. 2 is a block diagram showing a configuration of a speech synthesizer.

FIG. 2 is a block diagram showing a configuration of the speech synthesizer 4.

The speech synthesizer 4 includes following components 41 to 49.

Phonological sequence/prosodic information is entered from the prosodic processing unit 3 to a phonological sequence/prosodic information input unit (hereinafter, referred simply to as "information input unit") 41.

A speech unit storage (hereinafter, referred to as "unit storage") 42 includes a number of speech units stored therein.

A speech unit environment storage (hereinafter, referred to as "environment storage") 43 includes phonological/prosodic environments corresponding to the speech units stored in the unit storage 42 stored therein.

A unit selector 44 selects a plurality of speech units from the speech units stored in the unit storage 42.

A periodic/aperiodic component decomposer (hereinafter, referred simply to as "decomposer") 45 decomposes a plurality of speech units selected by the unit selector 44 into the periodic components and the aperiodic components, respectively.

A periodic component fusing unit 46 fuses the periodic components of the plurality of speech units obtained from the decomposer 45 and generates a speech unit having a new periodic component.

An aperiodic component fusing unit 46 fuses the aperiodic components of the plurality of speech units obtained from the decomposer 45 and generates a speech unit having a new aperiodic component.

A unit adder/editor/concatenator (hereinafter, referred to simply as "adder") 48 adds, edits and concatenates the speech units of the periodic components and the waveforms of the aperiodic components generated in the periodic component fusing unit 46 and the aperiodic component fusing unit 47 to generate a speech waveform of the synthesized speech.

A speech waveform output unit 49 outputs the speech waveform generated in the adder 48.

The functions of the respective units 41 to 49 are able to be realized by a program stored in a computer.

Subsequently, each block in FIG. 2 will be described in detail.

(3) Information Input Unit 41

The information input unit 41 outputs the phonological sequence/prosodic information entered from the prosodic processing unit 3 to the unit selector 44.

Here, the phonological sequence is, for example, a sequence of phonological symbols. The prosodic information includes the fundamental frequency, the phonological duration and the power.

Hereinafter, the phonological sequence and the prosodic information to be entered to the information input unit 41 are referred to as input phonological sequence and input prosodic information, respectively.

(4) Unit Storage 42

The unit storage 42 includes a number of speech units, which are short segments of speech in synthesis units and used when generating the synthesized speech, stored therein (hereinafter, referred to as "synthesis unit").

Here, the term "synthesis unit" is a combination of phonemes or subdivisions of phonemes (for example, semi-phonemes), for example, semi-phonemes, phonemes (C, V), diphones (CV, VC, VV), triphones (CVC, VCV), and syllables (CV, V) (V designates a vowel, C designates a consonant) and, it may be variable in length such as the mixture thereof.

The speech units indicate the waveforms of the speech signals corresponding to the synthesis unit or a parameter sequence which indicates the characteristics thereof.

Figure 3:
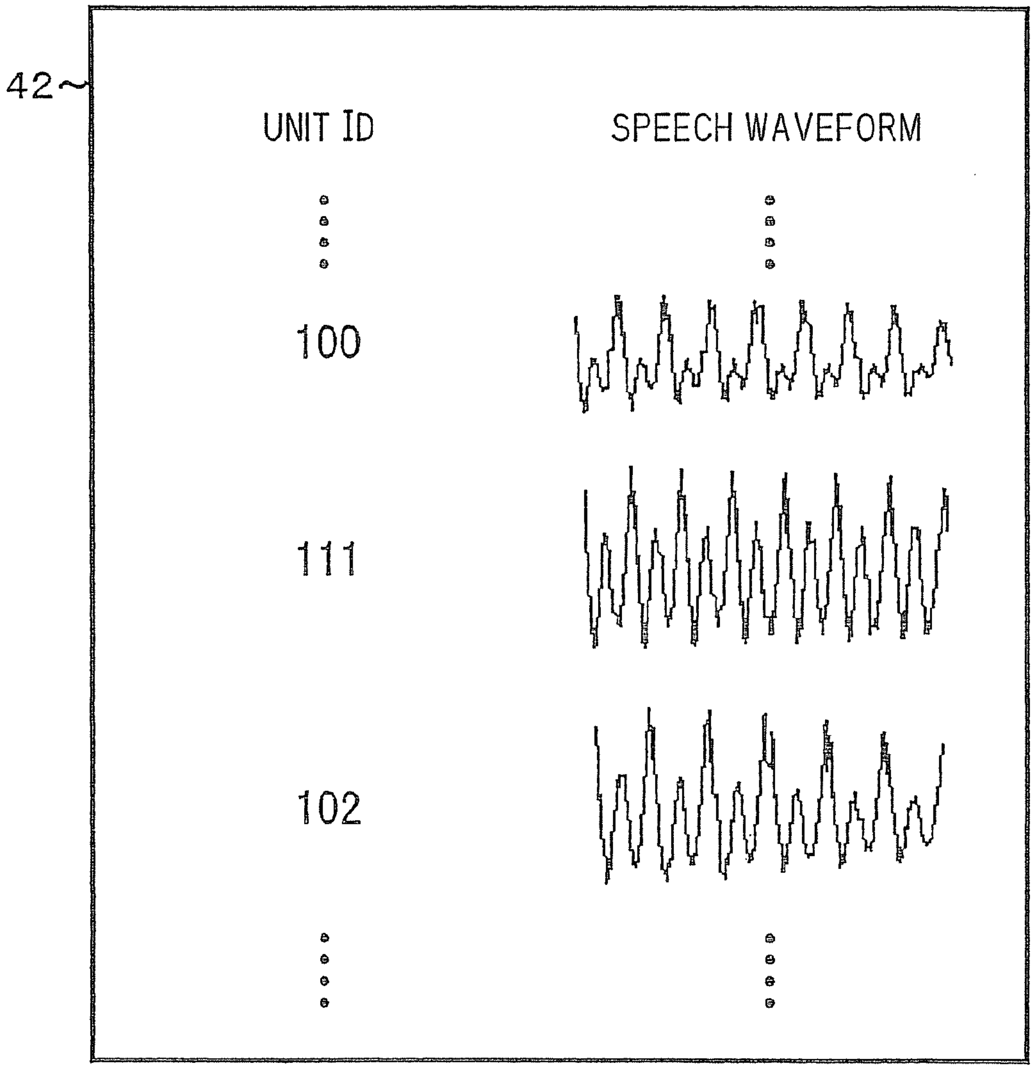
FIG. 3 is a drawing showing an example of speech units stored in a unit storage.

FIG. 3 shows an example of the speech units stored in the unit storage 42. As shown in FIG. 3, the unit storage 42 stores the speech units as the waveforms of the speech signals of the respective phonemes together with the unit IDs for identification of the speech units. These speech units are extracted from large speech data, which was recorded separately, according to the phoneme labels; the phoneme labels indicate the starting and/or ending times of respective phonemes and are put to the recorded speech data in advance.

(5) Environment Storage 43

The environment storage 43 includes the phonological/prosodic environments corresponding to the speech units stored in the unit storage 42 stored therein.

The term "phonological/prosodic environment" is a combination of elements which constitutes an environment for the corresponding speech unit.

The elements includes name of the phoneme, preceding phoneme, next phoneme, next phoneme, fundamental frequency, phonological (segmental) duration, power, whether the syllable is stressed or not, position from an accent nucleus, distance (in number of syllables, etc.) from pause, speed of utterance, and emotion, for the speech unit.

The environment storage 43 includes acoustic characteristics of the respective speech units stored therein such as the cepstral coefficients at the start and terminal ends of the speech unit, which are to be used for selecting speech units.

The phonological/prosodic environments and the quantity of acoustic characteristic of the speech units to be stored in the environment storage 43 are generally referred to as "unit environment", hereinafter.

FIG. 4 shows an example of the unit environments to be stored in the environment storage 43. The environment storage 43 shown in FIG. 4 stores the unit environments corresponding to the unit IDs of the respective speech units to be stored in the unit storage 42. Here, the phonetic categories (names of phoneme) corresponding to the speech units, the adjacent phonetic categories (two phonemes each before and after the concerned phoneme), the fundamental frequencies and the phonological durations are stored as the phonological/prosodic environment, and the cepstral coefficients at the start and terminal ends of the speech units are stored as the quantity of acoustic characteristics.

These unit environments are obtained by analyzing the speech data from which the speech units are extracted.

Although FIG. 4 shows only the case in which the synthesis unit is the phoneme, the synthesis unit for the speech units may be semi-phoneme, diphone, triphone, syllable and a combination thereof and those having a variable length.

(6) Aperiodic Component Fusing Unit 47

Figure 5:
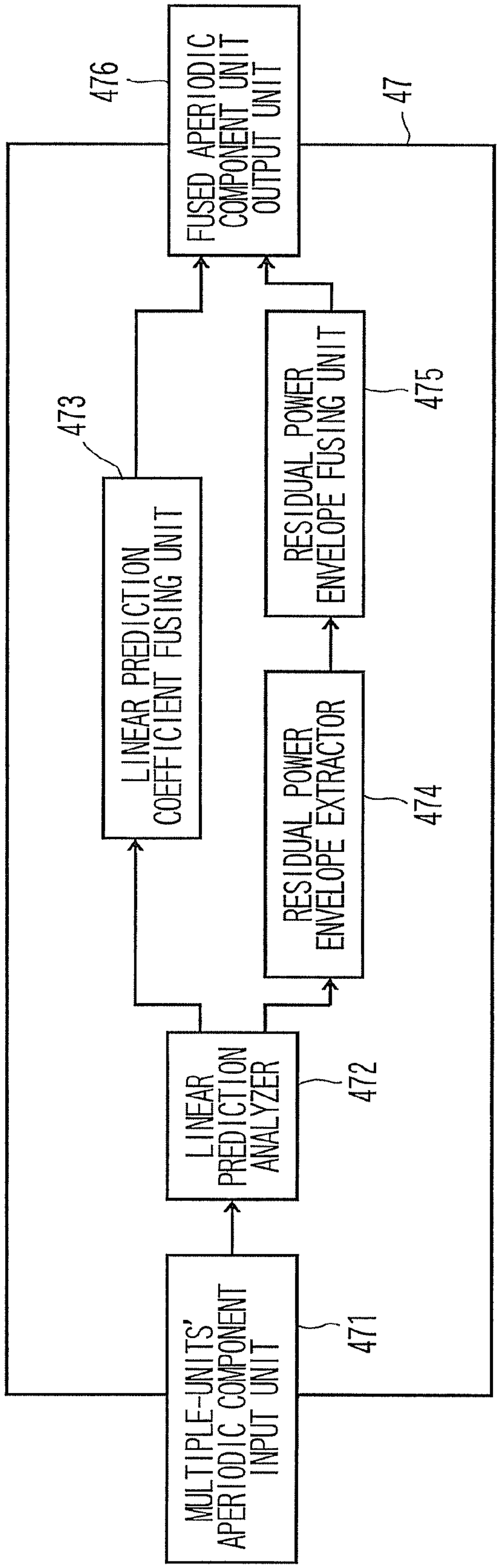
FIG. 5 is a block diagram showing a configuration of an aperiodic component fusing unit.

Referring to FIG. 5, the aperiodic component fusing unit 47 will be described. FIG. 5 is a block diagram showing an example of a configuration of the aperiodic component fusing unit 47.

The aperiodic component fusing unit 47 includes following components 471 to 476.

The aperiodic components of the plurality of speech units are entered to a multiple-units' aperiodic component input unit 471.

A linear prediction analyzer 472 makes linear prediction analysis for each of the entered plurality of aperiodic components and outputs a set of linear prediction coefficients and the linear prediction residual waveform for each of the plurality of aperiodic components.

A linear prediction coefficient fusing unit 473 fuses the plurality of sets of linear prediction coefficients output from the linear prediction analyzer 472 to generate a new set of linear prediction coefficients.

A residual power envelope extractor 474 extracts a power envelope of the linear prediction residual waveform from each of the plurality of linear prediction residual waveforms output from the linear prediction analyzer 472.

A residual power envelope fusing unit 475 fuses the plurality of residual power envelopes extracted in the residual power envelope extractor 474 and generates a new residual power envelope.

A fused aperiodic component unit output unit 476 combines the fused linear prediction coefficient and the fused residual power envelope generated in the linear prediction coefficient fusing unit 473 and the residual power envelope fusing unit 475 as a set and outputs as the fused aperiodic component units.

The detailed operations of the components included in the aperiodic component fusing unit 47 will be described later.

(7) Adder 48

Figure 6:
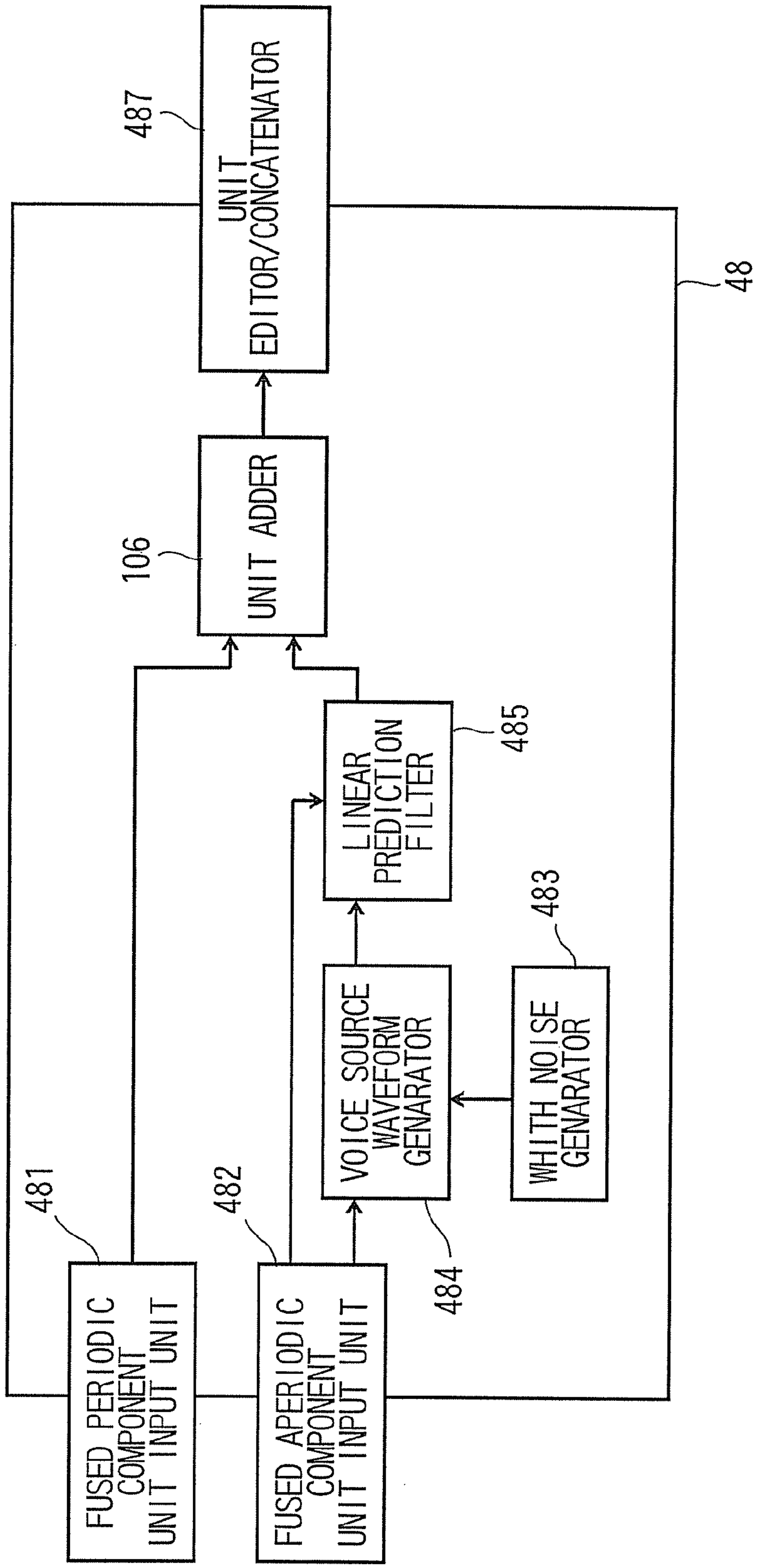
FIG. 6 is a block diagram showing a configuration of an adder.

Referring to FIG. 6, the adder 48 will be described. FIG. 6 is a block diagram showing an example of the configuration of the adder 48.

The adder 48 includes following components 481 to 487.

The fused periodic components units obtained by fusing the plurality of periodic components of the speech units are entered to a fused periodic component unit input unit 481.

The fused aperiodic components units obtained by fusing the plurality of aperiodic components of the speech units are entered to a fused aperiodic component unit input unit 482.

A white noise generator 483 generates different white noises each time of being called up.

A voice source waveform generator 484 generates voice source waveforms of the aperiodic components by modulating the amplitude of the white noises generated by the white noise generator 483 according to the fused residual power envelope entered from the fused aperiodic component unit input unit 482.

A linear prediction filter 485 generates the speech waveform of the fused aperiodic components unit by carrying out a linear prediction filtering on the voice source waveform generated by the voice source waveform generator 484 using the fused linear prediction coefficient entered from the fused aperiodic component unit input unit 482.

A unit adder 486 adds the speech waveform of the fused periodic components unit entered from the fused periodic component unit input unit 481 and the speech waveform of the fused aperiodic components unit entered from the linear prediction filter 485 to generate a new fused speech unit.

A unit editor/concatenator 487 concatenates the fused speech units generated by the unit adder 486 while editing the prosody or the like, and generates a speech waveform of the synthesized speech.

The detailed operations of the components included in the adder 48 will be described later.

Referring now to FIG. 2, the detailed operation of the speech synthesizer 4 will be described.

(8) Operation of Unit Selector 44

The phonological sequence entered to the unit selector 44 via the information input unit 41 shown in FIG. 2 is delimited by the unit of synthesis. Hereinafter, the delimited unit of synthesis is referred to as "segment".

The unit selector 44 references the environment storage 43 and selects a combination of a plurality of the speech units to be fused for each segment.

To select such combinations of speech units, the unit selector 44 uses a cost; the cost is a measure for selecting speech units and indirectly represents the magnitude of distortion between the synthesized speech and the target speech when the synthesized speech is synthesized using each speech unit candidate. Such cost is also used in the general unit-selection type method and the multiple unit selection and fusion type method in the related arts. The unit selector 44 selects a combination of the speech units to be fused to achieve the minimum cost.

The term "target speech" is a (virtual) speech which becomes a target when synthesizing the speech, that is, a speech which realizes the entered arrangement of phonetic sounds and the rhythm and is an ideally natural speech.

(8-1) Cost

The cost roughly includes two types of costs.

The first cost is a target cost which indicates the degree of distortion of the synthesized speech generated when using a speech unit in the target phonological/prosodic environment with respect to the target speech.

The second cost is a concatenation cost indicating the degree of distortion of the synthesized speech generated when concatenating a speech unit with its adjacent speech unit with respect to the target speech.

Detailed description will be given below.

The target cost includes a distortion generated by the difference between the fundamental frequency of the speech unit and the target fundamental frequency (fundamental frequency cost), a distortion generated by the difference between the phonological duration of the speech unit and the target phonological duration (duration cost), and a distortion generated by the difference between the phonological environment to which the speech unit belongs to and the target phonological environment (phonological environment cost).

The concatenation cost includes a distortion generated by the difference of the spectrums of successive speech units at their boundary (spectrum concatenating cost) and a distortion generated by the difference of the fundamental frequencies of the successive speech units at their boundary (fundamental frequency concatenation cost).

(8-2) Method of Selecting Speech Units

An example of the method of selecting a plurality of speech units for each segment using the cost is disclosed in Patent Document 2. Referring to the flowchart in FIG. 7, a brief description of this selection method will be described about a case of selecting M pieces of speech units per segment.

In Step S101, the unit selector 44 divides the entered phonological sequence into segments in units of synthesis. The number of divided segments is represented by N.

In Step S102, one sequence of speech units, which contains a single speech unit per a segment, is selected from the group of speech units stored in the unit storage 42. At this time of selection, the sequence of the speech units having the minimum summation (total cost) of the cost as the sequence (optimal unit sequence) is obtained on the basis of the entered target phonological sequence/prosodic information and the information of the speech unit environment of the environment storage 43. When searching the optimal unit sequence, a dynamic programming (DP) is efficiently used.

In Step S103, an initial value "1" is set to a counter "i" which indicates the segment number.

In Step S104, a cost is calculated for each of the speech unit candidates for the segment i. The cost used in this case is the sum of the target cost of the speech unit candidate and the concatenating cost between the optimal speech units of the previous and following segments (the speech units included in the optimal unit sequence) and the speech unit candidate.

In Step S105, M pieces of speech units from the top in terms of smallness of the cost are selected using the cost calculated in Step S104.

In Step S106, whether or not the counter i is N or smaller is determined. When the counter i is N or smaller (Yes in Step S106), the procedure goes to Step S107, and if not (NO in Step S106), the process of selecting speech units is ended.

In Step S107, the value of the counter i is incremented by one, and the procedure goes to Step S104.

(8-3) Summary

In this manner, the unit selector 44 selects M pieces of speech units for each segment, and outputs the selected speech units to the decomposer 45.

The method of selecting a plurality of speech units per segment in the unit selector 44 is not limited to the method described above, and any method may be used as long as adequate sets of speech units may be selected under some evaluation measure such as the cost.

(9) Operation of Decomposer 45

The decomposer 45 extracts the plurality of speech units selected for each segment by the unit selector 44 individually from the unit storage 42, and decomposes each of the speech units into the periodic component and the aperiodic component.

In the first embodiment, the term "periodic component" designates a waveform component which is substantially periodically repeated at the fundamental frequency and, in the frequency domain, it means a component which constitutes a harmonic overtone components of the fundamental frequency (components occurring at the integral multiples of the fundamental frequency).

In contrast, the term "aperiodic component" designates waveform components other than the periodic component.

(9-1) PSHF

As a method of separating the speech waveform into the periodic component and the aperiodic component, a method, so-called PSHF (pitch-scaled harmonic filter) is disclosed in P Jackson "Pitch-Scaled Estimation of Simultaneous Voiced and Turbulence-Noise Components in Speech", IEEE, Trans. Speech and Audio Processing, vol. 9, Pp. 713-726, October 2001".

In this PSHF, speech waveform is decomposed into the periodic component and aperiodic component using the fact that, when discrete Fourier transform (DFT) is carried out on a waveform extracted from a periodic waveform by windowing (normally by using Hanning window) with a window width of N times (normally, N=4 or 3 is used) the fundamental frequency with the length thereof as an analysis length, most part of the harmonic overtone components appear at positions of integral multiples of N (When N=4, 4, 8, 12, . . . ). More specifically, the following procedure is to be followed.

First of all, at each sample point in the entered speech waveform, a waveform is extracted by windowing with the Hanning window having a window width corresponding to N times the basic frequency, and having the window center at that sample point, and the DFT is applied with the same analysis length as the window width thereto, and the components in the frequency bins at positions of integral multiples of N are decomposed as the periodic components and the remaining components as the aperiodic components.

In the aperiodic components decomposed here, the power of the frequency bins at positions of integral multiples of N is zero and, consequently, the spectrum envelope is discontinuous. Therefore, part of the periodic components is redistributed to the aperiodic components under an assumption that the spectrum envelope of the aperiodic components changes smoothly toward the frequency (power interpolation).

In this manner, the periodic components and the aperiodic components extracted at the respective sample points are applied with inverse Fourier transform individually to obtain waveforms of the time domain and the periodic component waveforms and the aperiodic component waveforms of all the sample points are overlapped and added on the time axis, so that the periodic components and the aperiodic components are reconstructed.

Figure 8A:
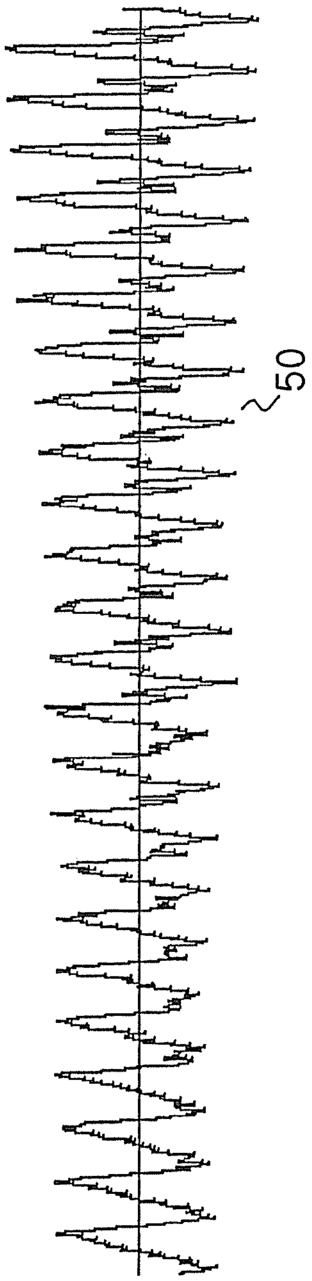
FIG. 8 is a drawing showing an example in which the speech waveform is decomposed into periodic component waveform and aperiodic component waveform using PSHF.
Figure 8B:
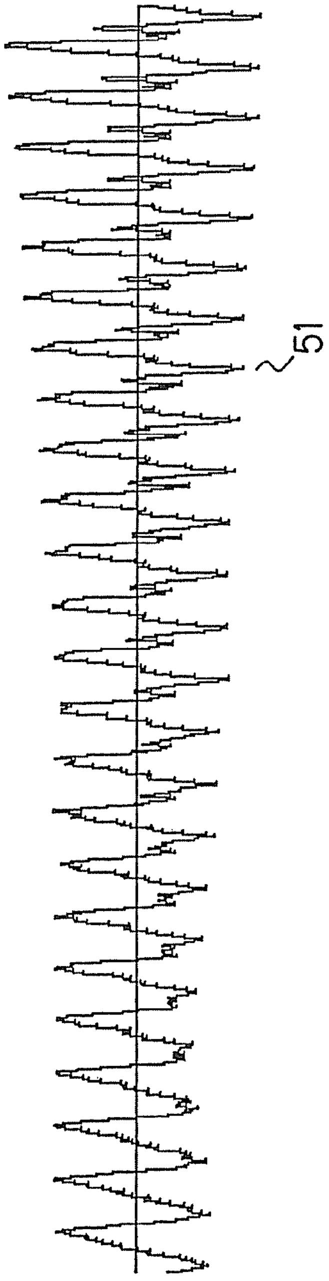
Figure 8C:
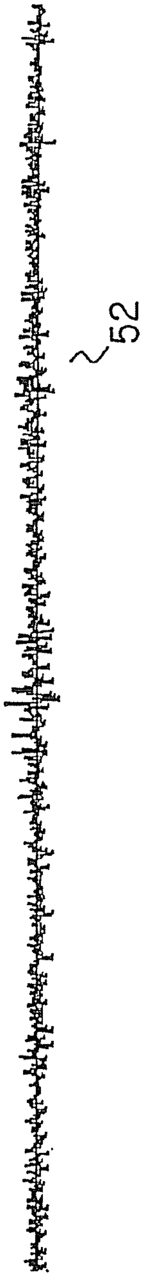

(9-2) Description of FIG. 8

FIG. 8 shows an example in which an actual speech waveform is decomposed into the periodic components and the aperiodic components using the PSHF.

A waveform designated by a reference numeral 50 is an original speech waveform and, actually is part of a portion pronounces as "ha". In contrast, a waveform designated by a reference numeral 51 is a waveform of the decomposed periodic components and a waveform designated by a reference numeral 52 is a waveform of the decomposed aperiodic components.

Actually, although there is a problem such that part of the periodic components is decomposed as the aperiodic components at positions where the fundamental frequency or the power changes rapidly (that is, part of the periodic components is leaked to the aperiodic components), decomposition of the periodic components and the aperiodic components is achieved substantially desirably by using this method as shown in FIG. 8, this method is employed in the first embodiment.

As regards the portion having no periodicity and hence the fundamental frequency cannot be obtained therefrom, such as the interior of a voiceless sound, the PSHF cannot be applied and hence all the components are distributed to the aperiodic components.

(9-3) Other Methods

However, the method of decomposing the periodic components and the aperiodic components is not necessarily limited thereto, and any method, such as PARD method (Periodic-Aperiodic Decomposition Algorithm) disclosed in B. Yegnanarayana, etc., "An iterative algorithm for decomposition of speech signals into periodic and aperiodic components", IEEE Trans. Speech Audio Processing, vol 6, pp. 1-11, February 1998, may be employed as long as the method can decompose speech waveform into the periodic components and the aperiodic components with high degree of accuracy.

In general voiced sounds, the periodic components are predominant in a frequency band lower than a certain frequency, while the aperiodic components are predominant in a frequency band higher than the certain frequency band in many cases. Therefore, the waveforms of the speech units may be simply decomposed into the low frequency components (low-pass components) lower than the certain frequency and the high frequency component (high-pass component) higher than the certain frequency to use the low-pass components as the periodic components and the high-pass components as the aperiodic components.

(9-4) Summary

The decomposer 45 uses the method shown above to decompose the each of the plurality of speech units selected for each segment into the periodic component and the aperiodic component. The obtained periodic component is outputted to the periodic component fusing unit 46, and the aperiodic component is outputted to the aperiodic component fusing unit 47.

(10) Operation of Periodic Component Fusing Unit 46

The periodic component fusing unit 46 fuses the periodic components of the plurality of speech units entered from the decomposer 45 for each segment and generates a new speech unit (hereinafter, referred to as "fused periodic component unit"). The method of fusing the periodic components of voiced sound is described in Patent Document 2 in detail. The method will be briefly described using FIG. 9 and FIG. 10.

Figure 9:
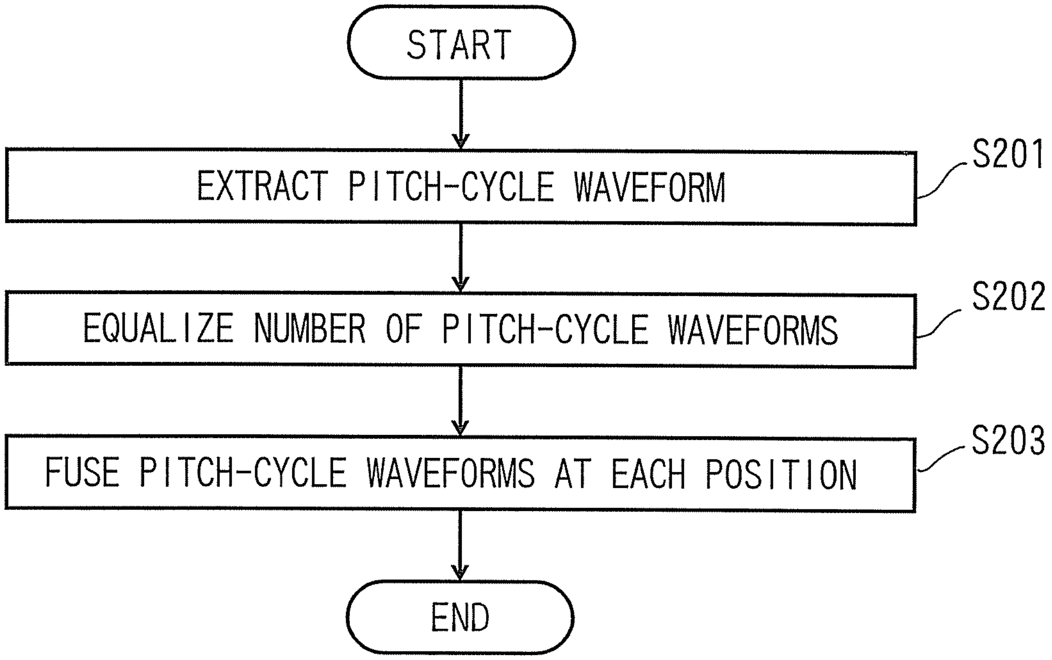
FIG. 9 is a flowchart showing an example of a method of generating a new speech waveform by fusing the speech waveform of a voiced sound.
Figure 10:
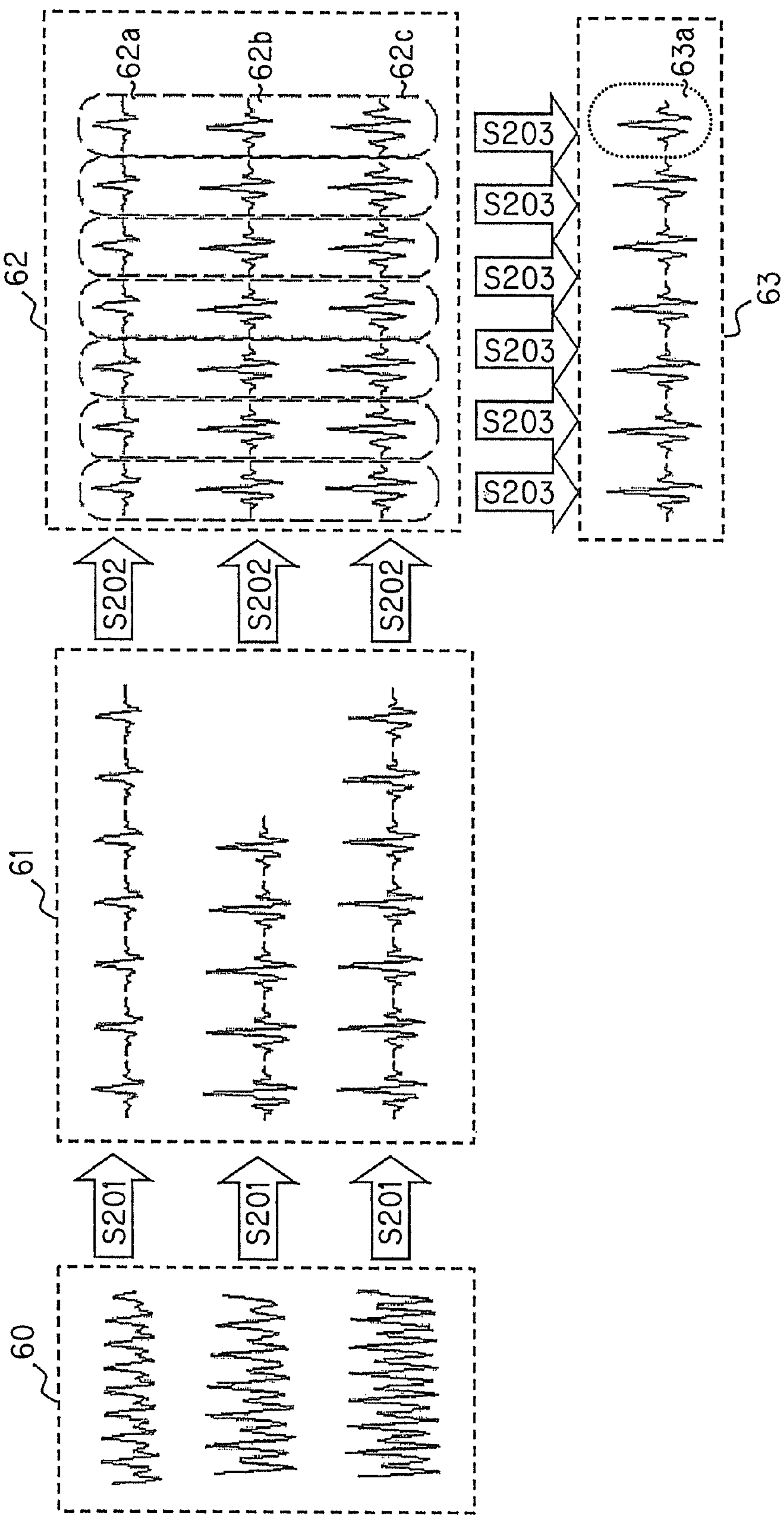
FIG. 10 is a drawing showing an example in which unit combination candidates including selected three speech units are fused to generate a new speech unit.

FIG. 9 is a flowchart showing a method of fusing the periodic component waveform of a voiced sound to generate a new speech waveform. FIG. 10 is a drawing showing an example of fusing a unit combination candidate 60 including three speech units selected for a certain segment to generate a new speech unit 63.

(10-1) Step S201

In Step S201, pitch-cycle waveforms are extracted from the selected respective speech units.

The term "pitch-cycle waveform" is a relatively short waveform having a length of about several times the fundamental period (or pitch period) of the speech and having no fundamental period by itself, and the spectrum thereof represents the spectrum envelope for the speech signal.

As a method of extracting such pitch-cycle waveform, there is a method of using a pitch synchronized window, which is used here.

Figure 13:
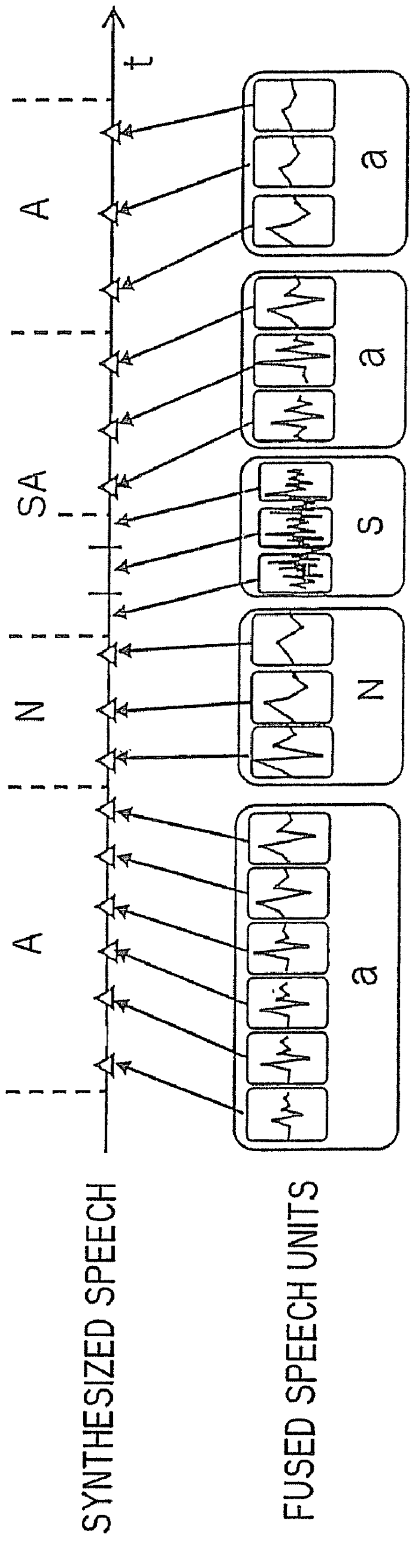
FIG. 13 is an explanatory drawing showing a process carried out in a unit editor/concatenator 487.

More specifically, marks (pitch marks) are provided at intervals of fundamental period for the speech waveform of the each speech unit, and a pitch-cycle waveform is extracted by windowing with a Hanning window having a window length two times the fundamental period having the center at the position of the pitch mark. A pitch-cycle waveform sequence 61 in FIG. 13 shows an example of the pitch-cycle waveform sequence obtained by cutting out from the respective speech units of the unit combination candidate 60.

(10-2) Step S202

In Step S202, the number of pitch-cycle waveforms is equalized so that the numbers of pitch-cycle waveforms with respect to each speech unit are equal to each other among the speech units.

The number of pitch-cycle waveforms is adjusted to the number of pitch-cycle waveforms required for generating a synthesized speech having the given target phonological duration in this embodiment, but, for example, it may be adjusted to the number of pitch-cycle waveforms of the speech unit having the largest number of waveforms.

The number of pitch-cycle waveforms of a sequence having a smaller number of pitch-cycle waveforms than the target one is increased by copying some pitch-cycle waveforms included in the sequence, while the one having a larger number of pitch-cycle waveforms is reduced by pruning some pitch-cycle waveforms in the sequence. The pitch-cycle waveform sequence 62 in FIG. 13 is an example in which the numbers of pitch-cycle waveforms are adjusted to be equal to seven.

(10-3) Step S203

In Step S203, after having equalized the number of pitch-cycle waveforms, the pitch-cycle waveforms of the respective speech units are fused at the respective positions, so that a new pitch-cycle waveform sequence is generated.

For example, a pitch-cycle waveform 63*a* included in the new pitch-cycle waveform 63 generated in FIG. 13 is obtained by fusing the seventh pitch-cycle waveforms 62*a*, 62*b* and 62*c* from among the pitch-cycle waveform sequence 62. The new pitch-cycle waveform sequence 63 generated in this manner is used as a fused speech unit.

There are some methods of fusing the pitch-cycle waveforms as follows:

A first method is a method of simply calculating an average of the pitch-cycle waveforms.

A second method is a method of correcting the positions of the respective pitch-cycle waveforms in the direction of time so that the highest correlation among pitch-cycle waveforms is obtained and then averaging the same.

A third method is a method of dividing the pitch-cycle waveforms into multiple frequency bands, correcting the positions of the pitch-cycle waveforms so that the highest correlation between the pitch-cycle waveforms for each band, averaging the same, and adding the results of averaging in each of the bands.

Although any one of these methods may be used, the third method described lastly is employed in the first embodiment.

(10-4) Summary

The periodic component fusing unit 46 fuses the periodic components of the plurality of speech units for each segment using the method described above to generate the fused periodic components units and outputs the same to the adder 48.

(11) Operation of Aperiodic Component Fusing Unit 47

The aperiodic component fusing unit 47 fuses the aperiodic components of the plurality of speech units entered from the decomposer 45 for each segment to generate a new speech unit (hereinafter, referred to as "fused aperiodic component unit").

The speech waveform of the aperiodic component has basically no correlation among different speech units. Therefore, averaging among the waveforms as in the method of fusing the periodic components described above only results in attenuation of amplitude, which is almost meaningless. Therefore, in the first embodiment, a speech generation model is used and the speech waveform of the aperiodic components is decomposed into a set of parameters indicating the characteristics of a vocal tract filter and a set of parameters indicating the characteristic of the voice source waveform, and fusion is carried out for the respective parameters.

Assuming that the system function of the speech generating model is an all-pole model here, these parameters are obtained using the linear prediction analysis. In other words, the linear prediction coefficients obtained by the liner prediction analysis represent the characteristics of the vocal tract filter and the linear prediction residual waveform represents the characteristics of the voice source waveform. The method of fusing the aperiodic components in detail will be described using FIG. 5.

(11-1) Multiple-Unit' Aperiodic Component Input Unit 471

First of all, each of the aperiodic components of the plurality of speech units per segment entered to the multiple-unit's aperiodic component input unit 471 is divided into units to carry out the linear prediction analysis.

The unit to carry out the linear prediction analysis may be a fixed-length frame. However, since the marks (pitch marks) are provided to every fundamental period on the speech waveform of the speech units, from which the aperiodic components are extracted, the analysis is carried out at each of these marks.

More specifically, the waveform as an object to be analyzed is extracted by windowing the speech waveform at each pitch mark with the Hanning window having a window width two times the pitch period and having the center at the position of the pitch mark.

Then, for each of the plurality of speech units for the concerned segment, the numbers of the pitch-cycle waveforms are equalized among the plurality of speech units so as to obtain the number of waveforms required for generating the synthesized speech having a target phonological duration by copying or pruning some pitch-cycle waveforms.

As regards portions having no periodicity and having no pitch mark provided thereto such as the interior of the voiceless sound, the analysis is carried out in units of fixed frame.

(11-2) Linear Prediction Analyzer 472.

In the linear prediction analyzer 472, the linear prediction analysis is carried out for each unit of analysis of the each speech unit. Here, the relation among the speech waveform to be analyzed, the linear prediction coefficients and the linear prediction residual waveform is expressed by the expression (1) shown below;

$$s(n) = \sum_{k=1}^{p} \alpha_k s(n-k) + e(n) \tag{1}$$

where s(n) is the speech waveform to be analyzed, $\alpha_k$(k=1, . . . , p, p is an analytical order) is the linear prediction coefficient, and e(n) is the linear prediction residual waveform.

In the linear prediction analysis, the linear prediction coefficient is obtained by minimizing the root mean square of the linear prediction residual waveform e(n) in Expression (1).

To do so, there are some well known methods such as an auto-correlation method, a covariance method, etc., but any of these methods may be employed. In this embodiment, a value of about 20 is employed as the analytical order p in the case in which the original speech waveform is sampled at 22 kHz.

The linear prediction analyzer 472 calculates the linear prediction coefficient and the linear prediction residual waveform for the each unit of analysis of the each aperiodic component by the linear prediction analysis, and outputs the linear prediction coefficient to the linear prediction coefficient fusing unit 473 and the linear prediction residual waveform to the residual power envelope extractor 474 as described above.

(11-3) Linear Prediction Coefficient Fusing Unit 473

The linear prediction coefficient fusing unit 473 fuses the linear prediction coefficients of a plurality of aperiodic components entered from the linear prediction analyzer 472 in units of analysis to generate a new linear prediction coefficient which indicates the spectrum characteristics expressed by these linear prediction coefficients in average.

Since simple averaging of the linear prediction coefficients by themselves among the plurality of aperiodic components does not necessarily average the spectrum characteristics indicated by these coefficients, in the first embodiment, the plurality of linear prediction coefficients are fused by averaging in the line spectrum pair (LSP) domain.

In order to do so, the following procedures are to be followed.

As a first step, the respective linear prediction coefficients are transformed into line spectrum pairs.

As a second step, the obtained a plurality of line spectrum pairs are averaged at every $i^{th}$ coefficient.

As a third step, the averaged line spectrum pair is transformed back to a linear prediction coefficient to obtain an average linear prediction coefficient.

The line spectrum pairs are generally superior in correspondence with formant frequencies, so that the spectrum characteristics which are common among the plurality of linear prediction coefficients are obtained relatively satisfactorily by averaging in the line spectrum pair domain.

However, the method of fusing the linear prediction coefficients is not limited to this method. For example, other methods such as calculating linear prediction poles from the linear prediction coefficients and interpolating the plurality of linear prediction poles, thereby obtaining an average linear prediction pole may also be employed.

The linear prediction coefficient fusing unit 473 generates a new linear prediction coefficient by fusion and outputs the same to the fused aperiodic component unit output unit 476 in the manner shown above.

(11-4) Residual Power Envelope Extractor 474

The residual power envelope extractor 474 extracts a power envelop of each of the linear prediction residual waveforms in units of analysis of the plurality of aperiodic components entered from the linear prediction analyzer 472.

Figure 11:
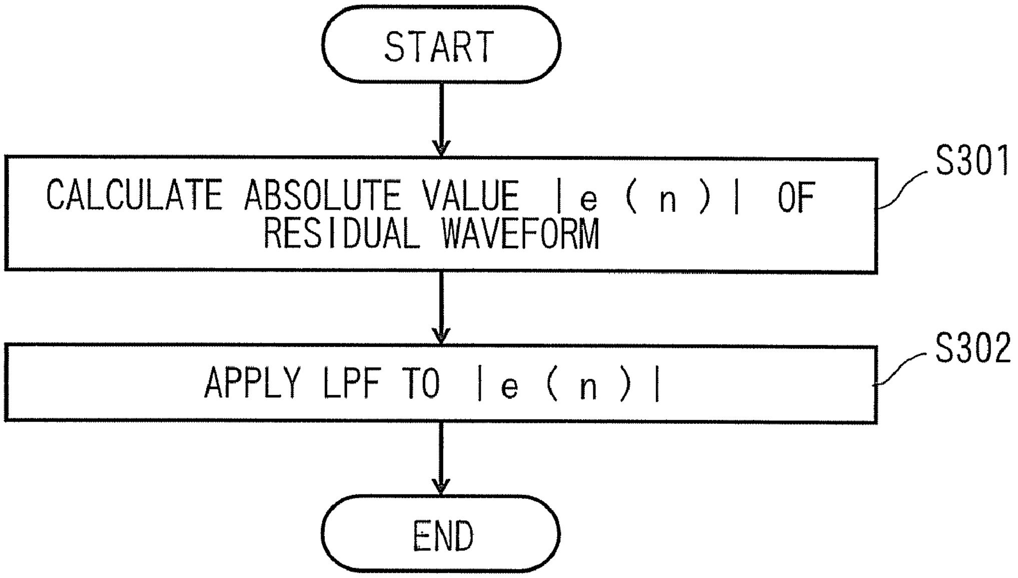
FIG. 11 is a flowchart showing an example of a method of extracting a power envelope of a linear prediction residual waveform.

In the first embodiment, a temporal change pattern of a short-time average amplitude is obtained as the power envelope of the residual. FIG. 11 is a flowchart for explaining a method of obtaining the temporal change pattern of short-time average amplitude from the linear prediction residual waveform e(n).

In Step S301, the residual power envelope extractor 474 calculates firstly an absolute value |e(n)| of the residual waveform e(n).

In Step S302, a low-pass filter (LPF) is applied to the value |e(n)| so that a temporal change pattern of short-time average amplitude M(n) is obtained.

In the first embodiment, an FIR filter employing the window function is used as the low-pass filter, and a rectangular window having a window width of eleven points may be used for a window function w(n). In other words, the short-time average amplitude in the first embodiment corresponds to the moving average of the eleven points of the value |e(n)|.

However, the method of obtaining the power envelop of the residual does not have to be limited to the method described above, and any methods such as a method of using the Hilbert transform may be used as long as the power change pattern in the direction of time is obtained.

The residual power envelope extractor 474 outputs the power envelope of the linear prediction residual waveform for each of the plurality of aperiodic components obtained in the manner described above to the residual power envelope fusing unit 475.

(11-5) Residual Power Envelope Fusing Unit 475

The residual power envelope fusing unit 475 fuses the power envelopes of the linear prediction residual waveform for each of the plurality of aperiodic components entered from the residual power envelope extractor 474 in units of analysis to generate a new power envelope of the residual.

Fusion of the power envelopes in this case is carried out by averaging out while ensuring the alignment in the direction of time so that the maximum correlation is obtained among the power envelopes. The method to do so will be described in detail using FIG. 12.

Figure 12:
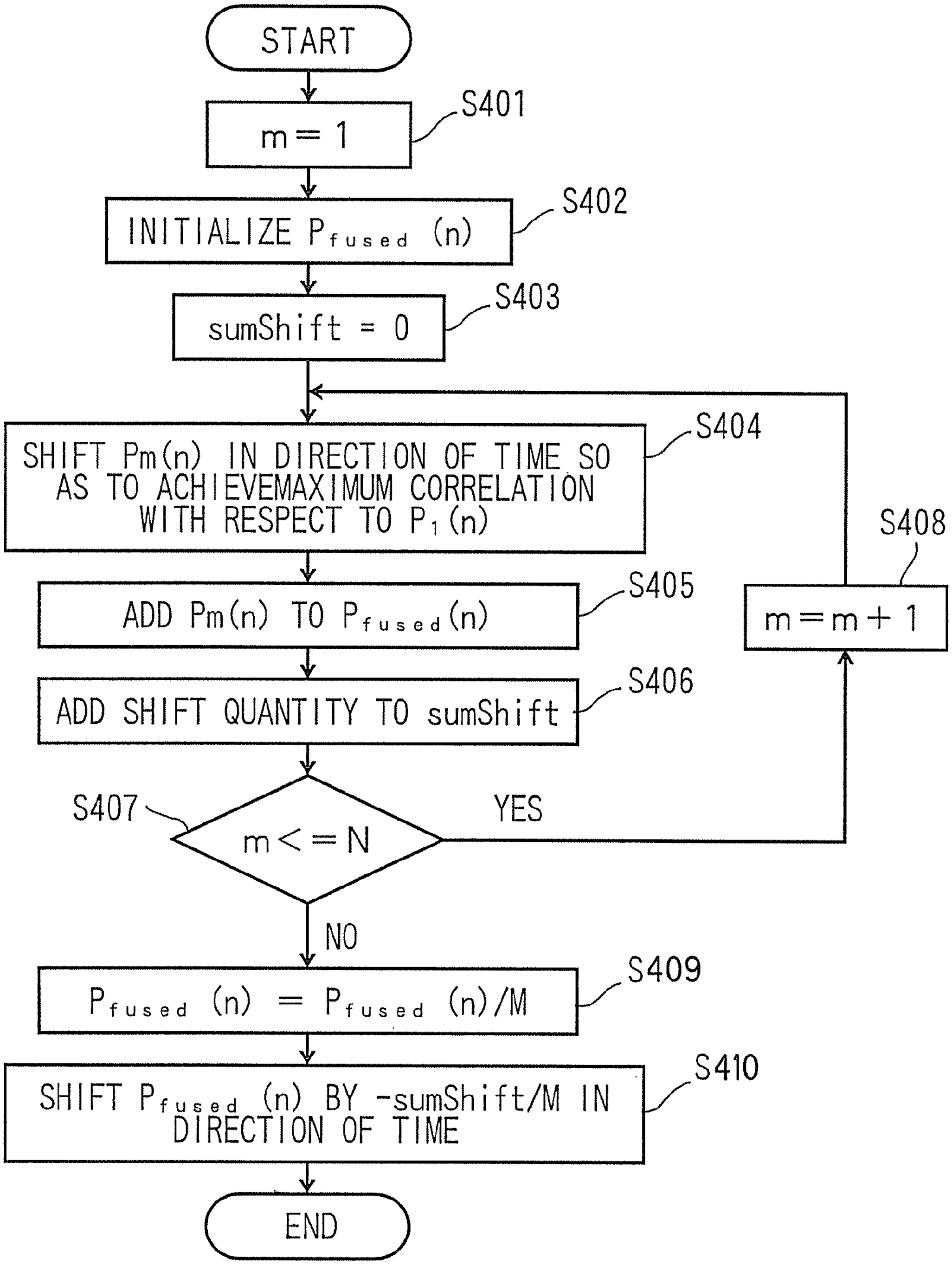
FIG. 12 is a flowchart showing an example of a method of fusing the residual power envelope.

FIG. 12 is a flowchart for explaining the method of fusing the power envelopes of the linear prediction residual waveform.

This flowchart shows a method of fusing M pieces of residual power envelopes, and $P_m(n)$ represents an $m^{th}$ residual power envelope, and $P_{fused}(n)$ represents a fused residual power envelope.

In Step S401, the value of counter m is initialized to "1".

In Step S402, all the amplitudes of the fused residual power envelope $P_{fused}(n)$ are initialized to "0".

In Step S403, the value of a variable sumShift is initialized to "0".

In Step S404, the correlation between the $m^{th}$ residual power envelope $P_m(n)$ and the first residual power envelope $P_1(n)$ is calculated, and $P_m(n)$ is shifted in the direction of time so as to obtain the maximum correlation.

In Step S405, the $m^{th}$ residual power envelope $P_m(n)$ is added to the fused residual power envelope $P_{fused}(n)$.

In Step S406, the shift quantity is added to the variable sumShift.

In Step S407, whether or not the value of the counter m does not exceed the value M is determined. If it does not exceed the value M (Yes in Step S407), the procedure goes to Step S408 and, when it exceeds the value M (No in Step S407), the procedure goes to Step S409.

In Step S408, the value of the counter m is incremented by one, and the procedure goes back to Step S404. In other words, the process from Step S404 to Step S407 is carried out for all the M pieces of residual power envelopes.

In Step S409, the amplitude of the fused residual power envelope $P_{fused}(n)$ is divided by M.

In Step S410, the fused residual power envelope $P_{fused}(n)$ is shifted by sumShift/M in the direction of time and all the process is ended.

The residual power envelope fusing unit 475 outputs the new residual power envelope obtained by the fusion as described above to the fused aperiodic component unit output unit 476.

However, the method of fusing the residual power envelope does not have to be limited to the method described above. For example, any methods may be used as long as the residual power envelope which indicates the average of the plurality of residual power envelopes is obtained.

(11-6) Fused Aperiodic Component Unit Output Unit 476

The fused aperiodic component unit output unit 476 outputs a set of the fused linear prediction coefficient entered from the linear prediction coefficient fusing unit 473 and the fused residual power envelope entered from the residual power envelope fusing unit 475 as the fused aperiodic component units to the adder 48.

(12) Adder 48

Subsequently, the operation of the adder 48 will be described in detail on the basis of FIG. 6.

(12-1) Input Units 481, 482

The fused periodic component unit for each segment is entered from the periodic component fusing unit 46 via the fused periodic component unit input unit 481 to the adder 48.

The fused aperiodic component unit is entered from the aperiodic component fusing unit 47 via the fused aperiodic component unit input unit 482 to the adder 48.

(12-2) Voice Source Waveform Generator 484

First of all, the fused residual power envelope of the fused aperiodic components unit is entered to the voice source waveform generator 484.

The voice source waveform generator 484 generates the voice source waveform of the fused aperiodic components unit by modulating the amplitude of the white noise waveform generated by the white noise generator 483 with the entered fused residual power envelope.

In the first embodiment, since the fused residual power envelope exists for every pitch mark (every frame having a fixed length in the case of the voiceless sound) in the fused aperiodic components unit for each of the segments, generation of the voice source waveform is actually carried out for the each pitch mark.

More specifically, the modulation of amplitude of the white noise waveform is carried out by multiplying the white noise waveform generated for a certain pitch mark by the fused residual power envelope. The white noise waveforms are generated by the white noise generator 483 so as to be different from pitch mark to pitch mark. Consequently, the voice source waveforms of the fused aperiodic component units generated by the voice source waveform generator 484 as a result have no correlation among the different pitch marks.

The voice source waveforms of the fused aperiodic component units generated in this manner are outputted to the linear prediction filter 485.

(12-3) Linear Prediction Filter 485

The linear prediction filter 485 generates the speech waveform of the fused aperiodic component unit by applying linear prediction filtering to the voice source waveform of the fused aperiodic component unit generated by the voice source waveform generator 484 using the fused linear prediction coefficient entered from the fused aperiodic component unit input unit 482.

(12-3-1) Compensation of Power

The power of the speech waveform of the fused aperiodic component unit generated in the manner described above may be smaller than the average power of the original aperiodic component waveforms. It is because the fused residual power envelope is obtained from the residual obtained by the linear prediction analysis using the respective aperiodic components of the original, and hence is highly likely smaller than the power of the residual in the case of the linear prediction analysis using the fused linear prediction coefficient.

Therefore, a post-process which compensates the power change as described above occurring on the aperiodic component waveform in the process from fusion to synthesis may be carried out in the linear prediction filter 485.

The compensation of the power is realized by obtaining an average power of the original aperiodic component waveforms in advance in the aperiodic component fusing unit 47, generating the speech waveform of the fused aperiodic component unit, then calculating its power, and then applying an uniform gain to whole the generated speech waveform so as to make its power equal to the above-described average power in the linear prediction filter 485.

(12-3-2) Formant Emphasis

The speech waveform of the fused aperiodic component unit generated in the manner described above is affected by the fusion of the aperiodic components and hence the spectrum envelope is smeared than the original aperiodic component waveform. Some formants are weakened, and consequently, the clarity may be deteriorated.

Therefore, post-processings such as the formant emphasis may be carried out in the aperiodic component fusing unit 47. For example, by filtering the generated speech waveform using the postfilter for achieving the formant emphasis disclosed in J. Chen, etc., "Adaptive Postfiltering for Quality Enhancement of Coded Speech", IEEE Trans. Speech and Audio Processing, vol. 3, January 1995, the formant in the spectrum envelope may be emphasized and lowering of the clarity due to fusion may be compensated.

(12-3-3) Summary

The speech waveform of the fused aperiodic component unit generated by the linear prediction filter 485 is outputted to the unit adder 486 as described above.

(12-4) Unit Adder 486

The unit adder 486 adds the speech waveform of the fused periodic component unit entered from the fused periodic component unit input unit 481 and the speech waveform of the fused aperiodic component unit entered from the linear prediction filter 485 to generate a new speech unit.

At this time, according to the first embodiment, the speech waveform of the fused periodic component unit and the speech waveform of the fused aperiodic component unit are simply added for each pitch-cycle waveform.

However, it is also possible to change the ratio of the both components to be added by the unit adder 486 on the basis of some value. For example, in a case in which it is adapted to be able to specify "the degree of breathiness (breath leakage at the glottis)" such as "normal", "strong" and "weak" from the outside of the unit adder 486, when the specified "degree of breathiness" is "normal", simple addition is carried out, and when "strong" is specified, the speech waveform of the fused aperiodic component unit is multiplied by a gain of 1.3 times before addition. In this case, a slightly husky voice is easily produced for example, and then the controllability of the speech quality of the synthesized speech is enhanced. The unit adder 486 outputs a new speech unit generated in the manner described above to the unit editor/concatenator 487.

(12-5) Unit Editor/Concatenator 487

The unit editor/concatenator 487 generates the speech waveform of the synthesized speech by editing and concatenating the speech units for each segment handed from the unit adder 486 according to the input prosodic information.

FIG. 13 is a drawing for explaining the process in the unit editor/concatenator 487. FIG. 13 shows a case of generating a speech waveform of "aNsaa" by editing and concatenating speech units corresponding to the respective units of synthesis of phonemes "a", "N", "s", "a", "a" generated by the unit adder 486.

In this example, the speech units of the voiced sound are expressed in a sequence of pitch-cycle waveforms. On the other hand, the speech units of the voiceless sound are expressed as the waveform for each frame.

The dotted lines in FIG. 13 represent the boundaries of the segments for the respective phonemes divided according to the target phonological duration, and hollow triangles represent positions (pitch marks) for overlapping and adding the respective pitch-cycle waveforms arranged according to the target fundamental frequency.

As shown in FIG. 13, as regards the voiced sounds, the respective pitch-cycle waveforms of the speech units are overlapped and added to the corresponding pitch marks and, as regards the voiceless sound, the waveforms of the respective frames are adhered to portions corresponding to the respective frames in the segment (the frame lengths are expanded and contracted according to the desired phonological duration by the voice source waveform generator 484), so that the speech waveform having the desired prosody (here, the fundamental frequency and the phonological duration) is generated.

(12-6) Summary

The speech waveforms of the synthesized speech generated by the adder 48 as described above are outputted from the speech waveform output unit 49.

(13) Advantages

As describe above, according to the first embodiment, attenuation of the aperiodic components or generation of noise due to the fusion are prevented by dividing the plurality of selected speech units in units of synthesis into the periodic components and the aperiodic components, and fusing and adding the both components with methods suitable for the respective components.

Also, according to the first embodiment, a sense of buzziness generated by periodic repetition of the aperiodic components is improved by using different voice source signals for the respective pitch-cycle waveforms of the aperiodic components and, consequently, a synthesized speech providing a high naturalness of speech is generated while maintaining the stability provided by the multiple unit selection and fusion type method of speech synthesis.

Second Embodiment

Figure 14:
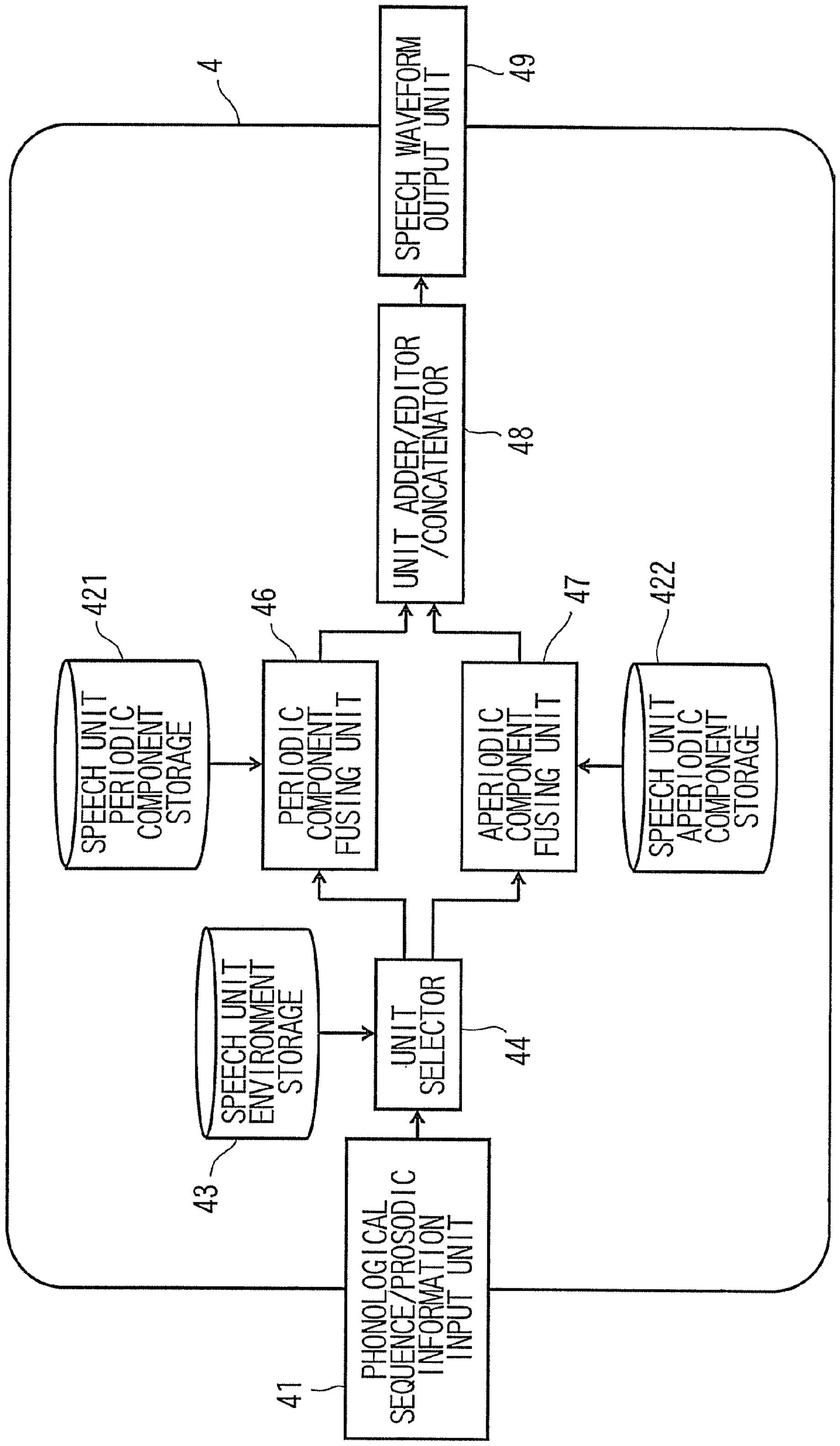
FIG. 14 is a block diagram showing a configuration of the speech synthesizer according to a second embodiment.

Referring to FIG. 14, the speech synthesizer 4 according to a second embodiment of the invention will be described.

(1) Summary of Second Embodiment

The speech synthesizer 4 according to the first embodiment includes the decomposer 45 in the interior thereof and decomposition of the periodic/aperiodic components is carried out online after having selected the speech units. However, the decomposition of the periodic/aperiodic components requires a quite large quantity of calculation, and hence the first embodiment is not very suitable for the application in which the synthesized waveform is generated in real-time.

For example, in the case of the PSHF which has been described as means for decomposing the periodic components and the aperiodic components, the analysis of DFT needs to be carried out with a length N times that of the fundamental frequency in the first embodiment. Therefore, the Fast Fourier Transform (FFT) cannot be used, and hence there is no means for speeding up significantly at this moment.

Accordingly, in the second embodiment, the speech waveforms of the speech units are decomposed into the periodic components and the aperiodic components off-line in advance, and the decomposed periodic components and aperiodic components are used for fusion.

(2) Configuration of Speech Synthesizer 4

FIG. 14 is a block diagram showing a configuration of the speech synthesizer 4 according to the second embodiment. The difference of the second embodiment from the first embodiment is mainly described using FIG. 14.

The speech synthesizer 4 is not provided with the decomposer 45 in the first embodiment, and is provided with a speech unit periodic component storage 421 and a speech unit aperiodic component storage 422 instead of the unit storage 42.

The speech unit periodic component storage 421 stores only the periodic components of the respective speech units.

The speech unit aperiodic component storage 422 stores only the aperiodic components of the respective speech units.

The periodic components and the aperiodic components of the respective speech units stored in the speech unit periodic component storage 421 and the speech unit aperiodic component storage 422 are obtained by decomposing the speech waveform of the respective speech units into the periodic components and aperiodic components off-line in advance using the same manner as those used in the decomposer 45 in the first embodiment.

(3) Operation of Speech Synthesizer 4

The operation of the speech synthesizer 4 in the second embodiment will be described. The operation of the speech synthesizer 4 is the same as in the first embodiment except that the operation of the periodic component fusing unit 46 and the aperiodic component fusing unit 47 is slightly different. The difference of the operation of the periodic component fusing unit 46 and the aperiodic component fusing unit 47 from that in the first embodiment will be described below.

The periodic component fusing unit 46 extracts the periodic components of each of the plurality of speech units selected for each segment by the unit selector 44 from the speech unit periodic component storage 421 and fuses the periodic components of the speech units. The method of fusing the periodic components is the same as that described in conjunction with the first embodiment.

The aperiodic component fusing unit 47 extracts the aperiodic components of each of the plurality of speech units selected for each segment by the unit selector 44 from the speech unit aperiodic component storage 422 and fuses the aperiodic components of the speech units. The method of fusing the aperiodic components is also the same as that described in the first embodiment.

(4) Advantages

As described above, according to the second embodiment, since the decomposition of the periodic/aperiodic components which requires a very large quantity of calculation is carried out off-line in advance, the substantially same effects of the speech quality improvement as in the first embodiment are realized with the quantity of calculation significantly smaller than in the first embodiment, and hence it is applicable to the application in which the synthesized waveforms are generated in real-time.

Third Embodiment

Figure 15:
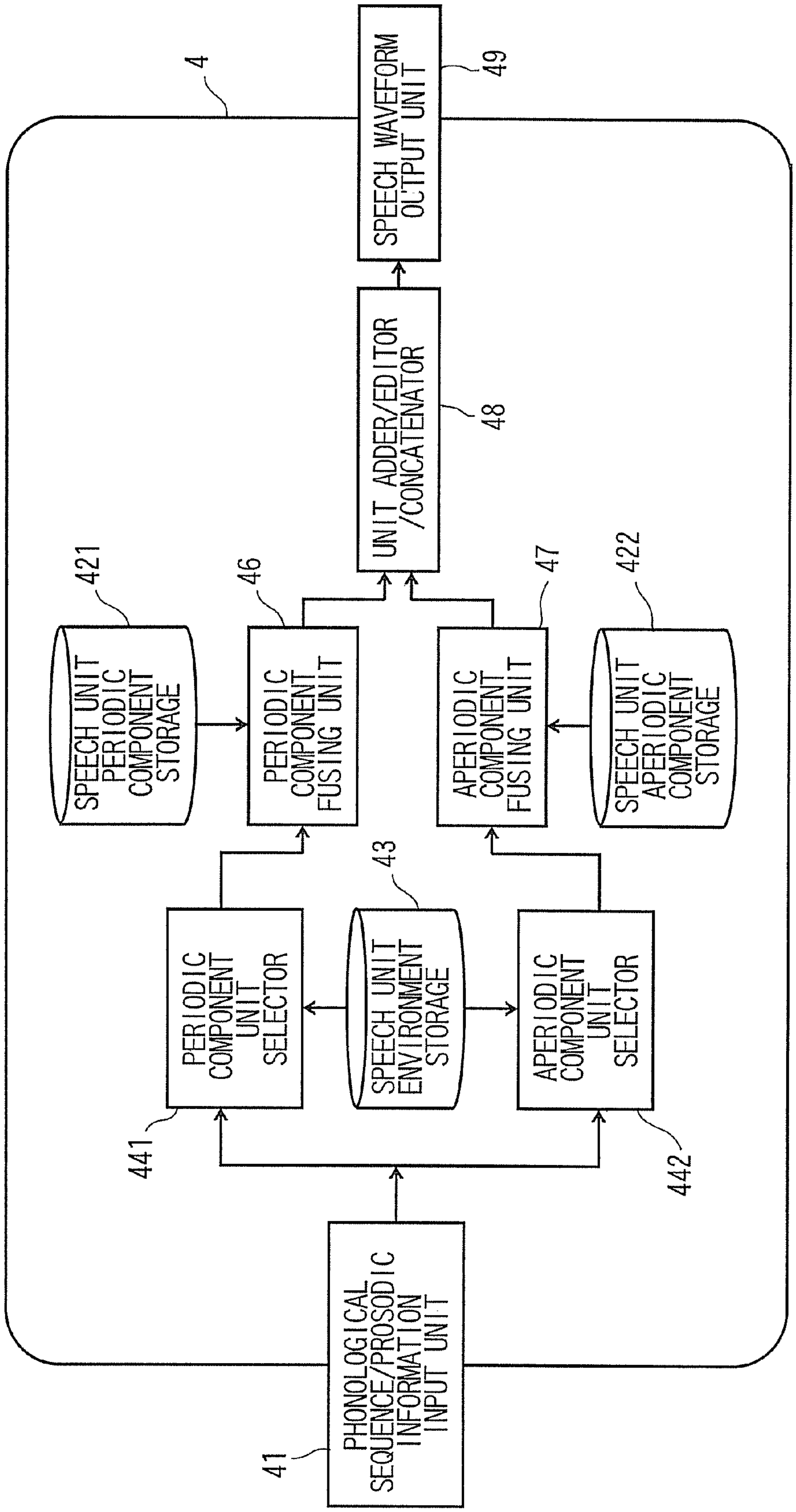
FIG. 15 is a block diagram showing a configuration of the speech synthesizer according to a third embodiment.

Referring now to FIG. 15, the speech synthesizer 4 according to a third embodiment of the invention will be described.

In the first and second embodiments, the common speech units are selected for the periodic components and the aperiodic components. However, the common speech units do not necessarily have to be selected for the both components.

Therefore, in the third embodiment, the speech units suitable for the respective components are selected separately.

(1) Configuration of Speech Synthesizer 4

FIG. 15 is a block diagram showing a configuration of the third embodiment. The difference of the third embodiment from the second embodiment is mainly described using FIG. 15.

The speech synthesizer 4 in the third embodiment includes the periodic component unit selector 441 and the aperiodic component unit selector 442 instead of the unit selector 44.

The periodic component unit selector 441 selects a plurality of speech units suitable for fusion of the periodic components for each segment.

The aperiodic component unit selector 442 selects a plurality of speech units suitable for fusion of the aperiodic components for each segment.

(2) Operation of Speech Synthesizer 4

The methods of selecting the speech units in the periodic component unit selector 441 and the aperiodic component unit selector 442 may be the common method for the both selectors 441, 442, or may be completely different from each other. However, when the common method is employed, the speech units selected as a result by the both selectors must be different in at least part of the segment by the difference of the parameter setting between the both selectors.

As an example, the method of selecting the speech units in the periodic component unit selector 441 and the aperiodic component unit selector 442 may be the same method for the both selectors 441, 442 as that described in the first embodiment.

However, differentiating the way of sub-cost weighing between the periodic component unit selector 441 and the aperiodic component unit selector 442 for the costs as the measure of evaluation in selection of the speech units would give a different selection result.

For example, while the difference in fundamental frequency at the time of synthesis with the original speech units and the difference in spectrum between the successive units affect significantly the speech quality of the finally synthesized sound for the periodic components, the difference in phonological environment at the time of synthesis with the original speech units seems to affect more significantly the speech quality for the aperiodic components. Therefore, it should be reasonable that the weight of the fundamental frequency cost or the spectrum concatenating cost should be set to a rather heavy weight for the periodic components, but the weight of the phonological environment cost is set to a rather heavy weight for the aperiodic components.

(3) Advantages

According to the third embodiment, since the speech units of the periodic components and the aperiodic components are selected in the methods suitable for the respective components as described above, a higher speech quality than in the cases of the first and second embodiments is realized.

Fourth Embodiment

Figure 16:
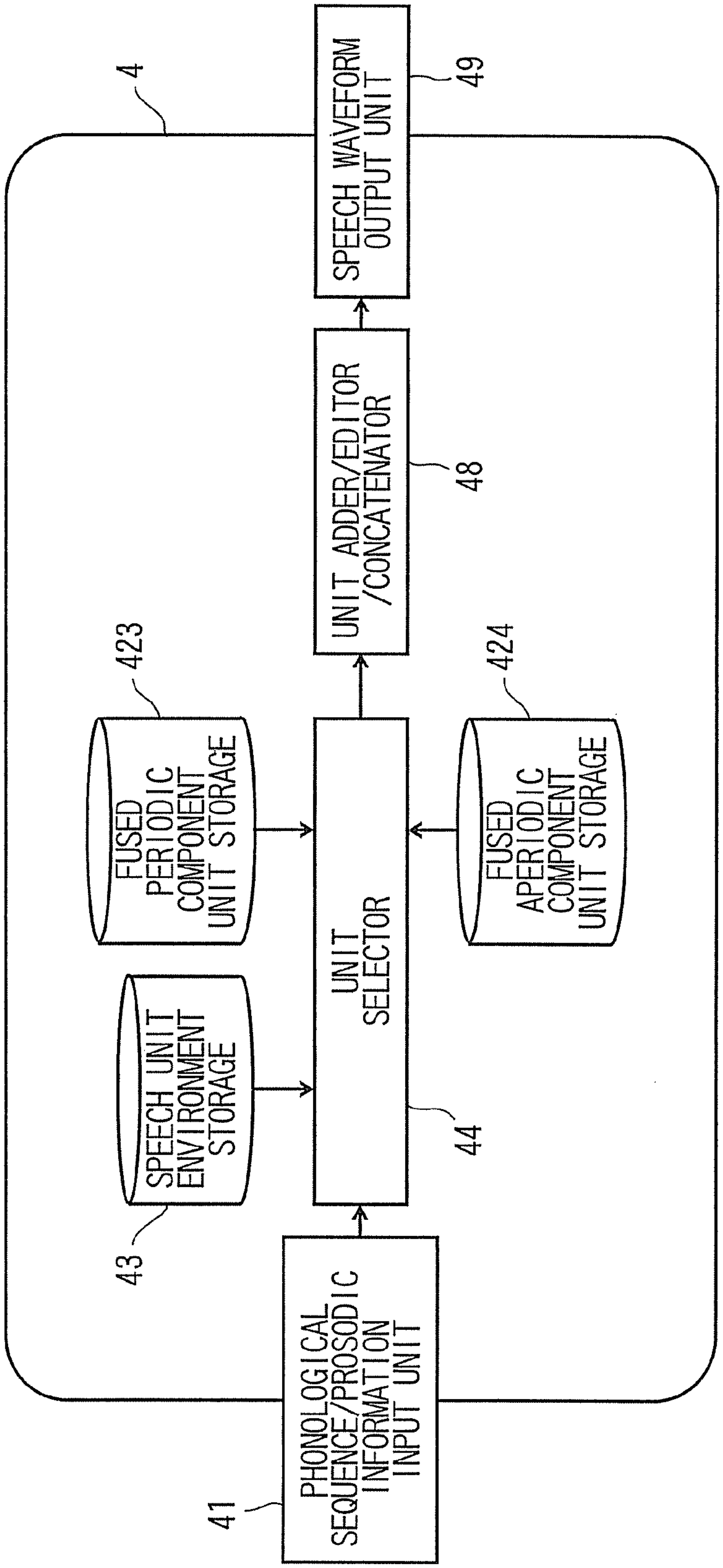
FIG. 16 is a block diagram showing a configuration of the speech synthesizer according to a fourth embodiment.
Figure 19:
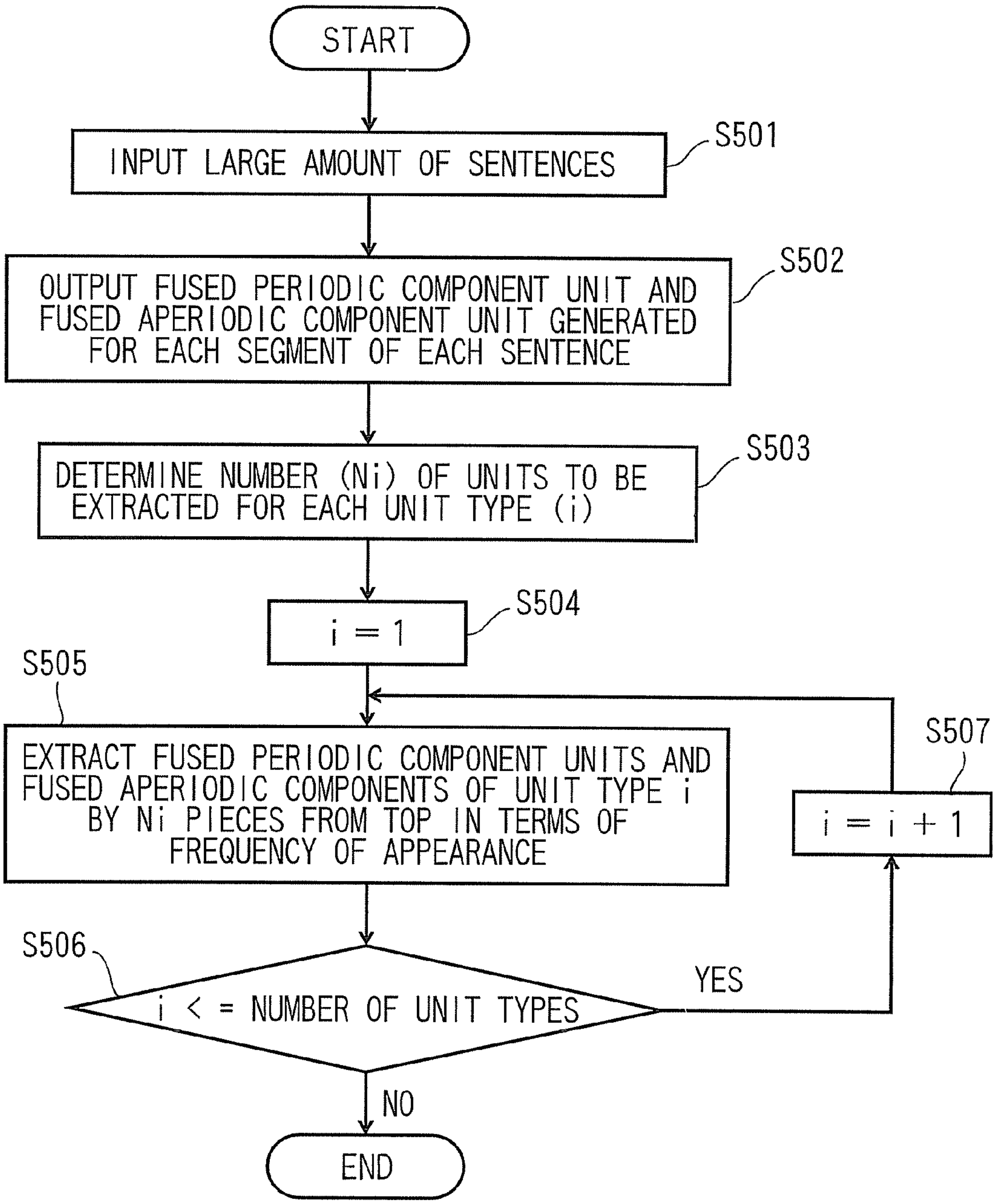
FIG. 19 is a flowchart showing a method of extracting units to be stored in a fused periodic component unit storage and a fused aperiodic component unit storage according to the fourth embodiment.

Referring now to FIG. 16 and FIG. 19, the speech synthesizer 4 according to a fourth embodiment of the invention will be described.

(1) Summary of Fourth Embodiment

Although the relatively small quantity of calculation is achieved in the second embodiment, since a relatively large quantity of calculation is originally required for fusing process of the speech units, the second embodiment is still difficult to be applied to a low-end middleware whose CPU specification is very low.

Therefore, in the fourth embodiment, the speech units fusing process is also carried out off-line in advance, and suitable speech units are selected from the fused speech units.

(2) Configuration of Speech Synthesizer 4

FIG. 16 is a block diagram showing a configuration of the speech synthesizer 4 according to the fourth embodiment. The different of the fourth embodiment from the second embodiment will mainly be described using FIG. 16.

In the fourth embodiment, the speech synthesizer 4 is not provided with the periodic component fusing unit 46 and the aperiodic component fusing unit 47 provided in the speech synthesizer 4 in the second embodiment. The unit storage 42 is provided with a fused periodic component unit storage 423 and a fused aperiodic component unit storage 424.

The fused periodic component unit storage 423 stores the fused periodic component units generated by fusing the periodic components of the plurality of speech units in the periodic component fusing unit 46 in the first and second embodiments.

The fused aperiodic component unit storage 424 stores the fused aperiodic component units generated by fusing the aperiodic components of the plurality of speech units in the aperiodic component fusing units 47 according to the first and second embodiments.

The fused periodic component units and the fused aperiodic component units stored in the fused periodic component unit storage 423 and the fused aperiodic component unit storage 424 are ones with a high frequency of appearance that were extracted from a large number of fused periodic component units and fused aperiodic component units generated actually by the periodic component fusing unit 46 and the aperiodic component fusing unit 47 when a large quantity of sentences are entered to the synthesizing apparatuses in the first and second embodiments.

(3) Method of Training

Referring now to FIG. 19, a method of training the fused periodic component units and the fused aperiodic component units by the fused periodic component unit storage 423 and the fused aperiodic component unit storage 424 (referred to as "both unit storages 423, 424" together) will be described.

FIG. 19 is a flowchart showing a method of extracting the fused periodic component units and the fused aperiodic component units to be stored in the both unit storages 423, 424.

In Step S501, a large quantity of sentences are entered to the synthesizing apparatus according to the first and second embodiments. The synthesizing apparatus in this case is added with an output unit for outputting the fused periodic component units generated in the periodic component fusing unit 46 and the fused aperiodic component units generated in the aperiodic component fusing unit 47, respectively.

In Step S502, the fused periodic component units and the fused aperiodic component units generated for each segment of each of the entered sentences are outputted from the respective fusing units 46, 47.

In Step S503, distribution of the number of speech units stored in the both unit storages 423, 424 specified from the outside to the respective unit types is determined. The unit type here means the type of the units classified on the basis of the phonological environment or the like. For example, the unit type /a/ means the unit corresponding to the phoneme /a/. The number of distribution of the units for each unit type is determined according to the frequency of appearance of the unit of each unit type. For example, when the frequency of appearance of the units of the unit type /a/ is higher than that of the units of the unit type /u/, the units are distributed more to the unit type /a/. The number of units to be distributed to the unit type i is represented by $N_i$.

In Step S504, an initial value 1 is set to the unit type number i.

In Step S505, the fused periodic component units and the fused aperiodic component units of the unit type i are extracted from the top in terms of the frequency of appearance by $N_i$ from the units of the unit type i outputted in Step S502.

Subsequently, in Step S506, i and the number of unit types are compared.

When i is smaller than the number of unit types, the procedure goes to Step S507 (YES in Step S506), i is incremented (Step S507), and the procedures in Steps S505 to S506 are repeated.

When i exceeds the number of unit types (that is, when the processes for all the unit types are completed), the procedure goes to END to terminate the process.

(4) Summary of Training

The fused periodic component units and the fused aperiodic component units extracted in the manner described above are stored in the fused periodic component unit storage 423 and the fused aperiodic component unit storage 424 respectively.

Here, the number of speech units to be selected for storing in the fused periodic component unit storage 423 and the fused aperiodic component unit storage 424 may be determined arbitrarily by trade-off between the total speech unit size and the speech quality of the synthesized speech. When a larger number of speech units are selected and stored, the size increases but the speech quality of the synthesized speech may be increased, and when the number of speech units is decreased, the size is reduced with the sacrifice of the speech quality of the synthesized speech.

(5) Modification

Although the method of extracting the units having a high frequency of appearance has been described here, extraction may be carried out by using the quantity of acoustic characteristics of the unit calculated at both ends of the units such as mel-frequency cepstrum or the like.

In this case, clustering is carried out for the fused periodic component units and the fused aperiodic component units outputted for each unit type respectively using the quantity of acoustic characteristics of the unit, and the units closest to the centers of the divided clusters (centroid) are extracted individually. The number of clusters to be obtained by the clustering is determined according to the number of units to be distributed for each unit type.

When extracting the units on the basis of the frequency of appearance, the units adequate for the context having a low frequency of appearance might not be extracted and hence the speech quality might be significantly deteriorated depending on the entered text. However, when the units are extracted according to the method shown here, a set of the units which covers as large range of the space of the quantity of acoustic characteristics as possible is extracted, so more stable generation of a synthesized sound than in the case of extraction on the basis of the frequency of appearance can be achieved.

(6) Unit Selector 44

The unit selector 44 according to the second embodiment selects the plurality of speech units for each segment, while the unit selector 44 in the fourth embodiment selects one optimal sequence of fused speech units for each segment.

Figure 7:
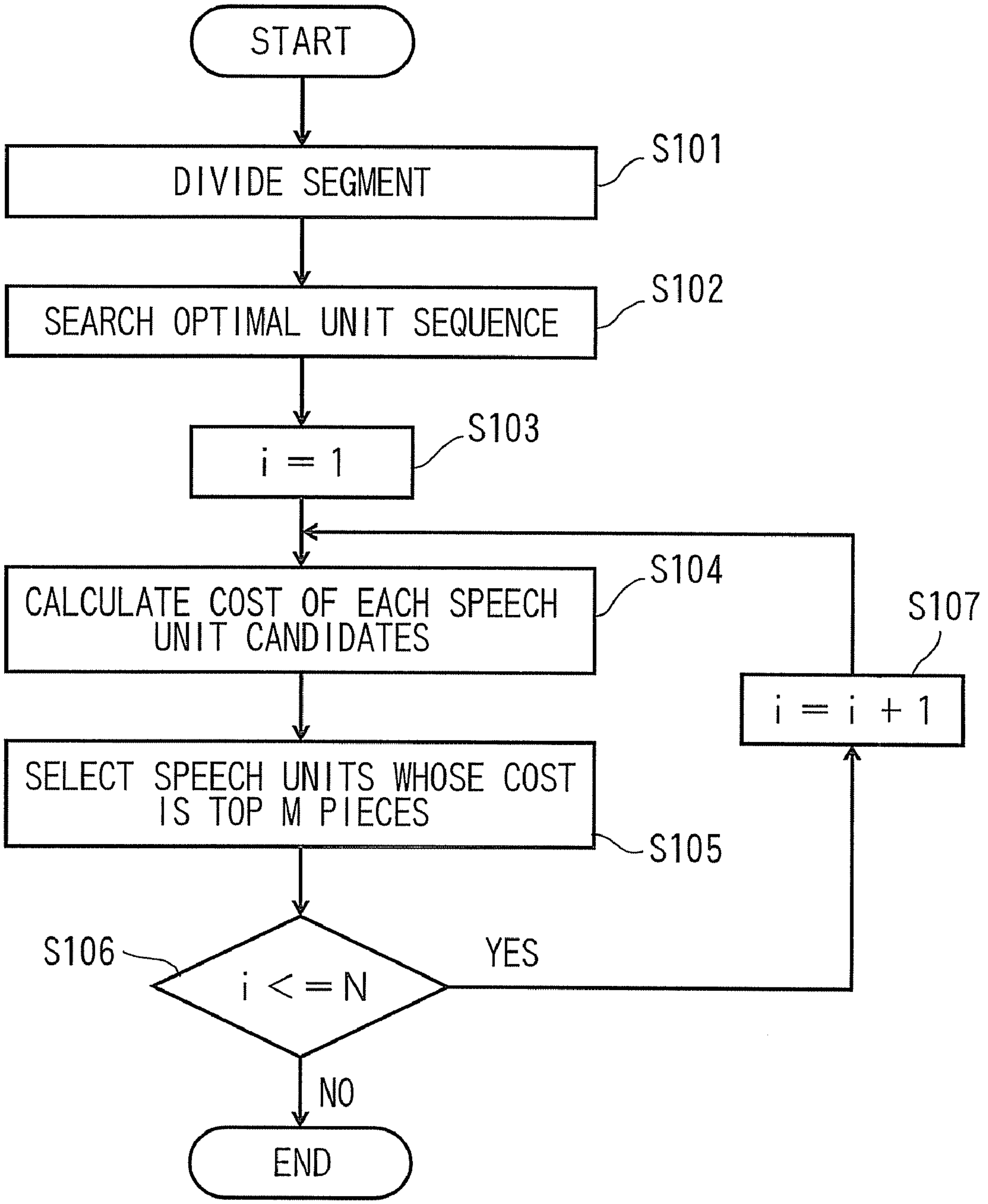
FIG. 7 is a flowchart showing an example of a method of selecting the speech units.

In other words, the operation of the unit selector 44 carries out only Step S101 and Step S102 in the flowchart shown in FIG. 7.

The unit selector 44 further extracts the fused periodic component units corresponding to the selected speech units from the fused periodic component unit storage 423, and the fused aperiodic component units from the fused aperiodic component unit storage 424, respectively, and outputs the same to the adder 48. The configuration and the operation of the adder 48 are the same as in the second embodiment.

(9) Advantages

As described above, according to the fourth embodiment, since the fusing process of the periodic components and the aperiodic components for the plurality of speech units are carried out off-line in advance, the substantially same effects of the speech quality improvement is achieved with the quantity of calculation smaller than in the second embodiment, the fourth embodiment may be applied also to the low-end middle ware whose CPU specification is very low.

The total size of the units to be stored may be determined scalably by the trade-off with the speech quality of the synthesized speech.

Fifth Embodiment

Figure 17:
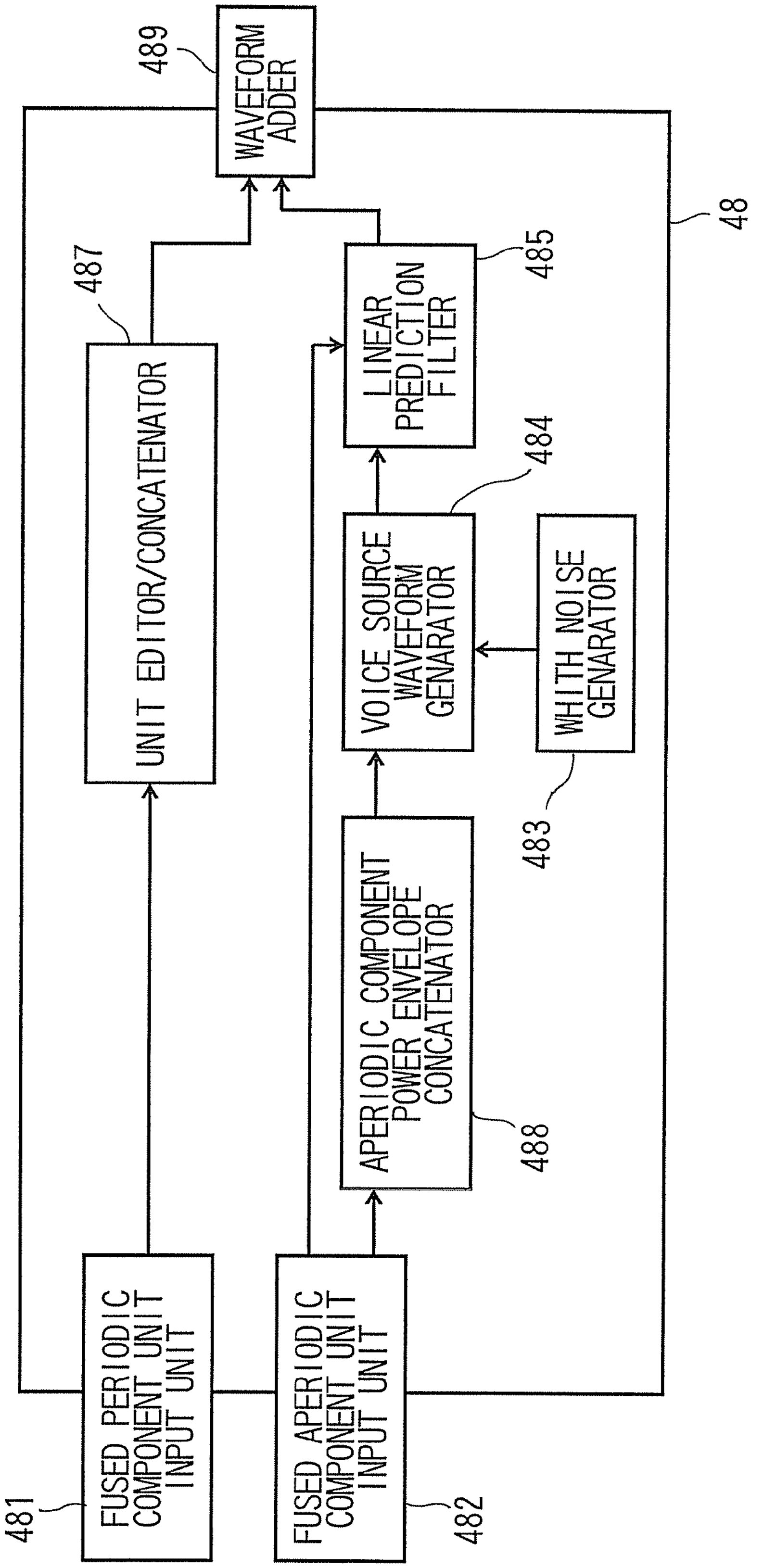
FIG. 17 is a block diagram showing a configuration of an adder according to a fifth embodiment.

Referring to FIG. 17, the adder 48 according to the fifth embodiment of the invention will be described.

(1) Summary of Adder 48

In the first embodiment, the method of concatenating the speech units with each other by the adder 48 after having added the periodic components and the aperiodic components of the fused speech units for each segment and generated new speech units has been described. However, in this method, different aperiodic components are unintentionally overlapped and added between the speech units or between the pitch-cycle waveforms, so that the power of the aperiodic components may be deteriorated or an unnatural periodicity may be generated at the overlapped and added position, whereby the speech quality may be deteriorated.

Therefore, in the fifth embodiment, concatenation of the speech units are carried out respectively for the periodic components and the aperiodic components, and then the generated periodic components and the aperiodic components are added.

(2) Configuration of Adder 48

FIG. 17 is a block diagram showing a configuration of the adder 48 according to the fifth embodiment. The difference of the configuration of the adder 48 according to the fifth embodiment from the first embodiment will mainly be described using FIG. 17.

The fused periodic component units obtained by fusing the periodic components of the plurality of speech units are entered to the fused periodic component unit input unit 481.

The fused aperiodic component units obtained by fusing the aperiodic components of the plurality of speech units are entered to the fused aperiodic component unit input unit 482.

The unit editor/concatenator 487 concatenates the fused periodic component units entered from the fused periodic component unit input unit 481 while editing the prosody or the like to generate the periodic component waveform of the synthesized speech.

The aperiodic component power envelope concatenator 488 concatenates the fused residual power envelopes entered from the fused aperiodic component unit input unit among pitch-cycle waveforms or the units to generate a series of residual power envelopes.

The white noise generator 483 generates white noise.

The voice source waveform generator 484 generates a voice source waveform of the aperiodic components by modulating the amplitude of the white noise generated by the white noise generator 483 according to the residual power envelopes generated by the aperiodic component power envelope concatenator 488.

The linear prediction filter 485 generates the aperiodic component waveforms of the synthesized speech by filtering the voice source waveform generated by the voice source waveform generator 484 by linear prediction filtering using the fused linear prediction coefficient entered from the fused aperiodic component unit input unit 482.

The waveform adder 489 generates the synthesized speech by adding the periodic component waveform of the synthesized speech generated by the unit editor/concatenator 487 and the aperiodic component waveform of the synthesized speech generated by the linear prediction filter 485.

(2) Operation of Adder 48

The difference in operation of the adder 48 in the fifth embodiment from the first embodiment will mainly be described using FIG. 17.

The aperiodic component power envelope concatenator 488 overlaps and adds the fused residual power envelope for each pitch-cycle waveform of the each segment entered from the fused aperiodic component unit input unit 482 on the positions (pitch marks) where the respective pitch-cycle waveforms to be arranged according to the target fundamental frequency are to be overlapped and added, thereby generating the residual power envelopes for one sentence or for one breath group.

The voice source waveform generator 484 modulates the amplitude of the white noise generated by the white noise generator 483 according to the residual power envelope generated by the aperiodic component power envelope concatenator 488, thereby generating the voice source waveform for one sentence of for one breath group.

The linear prediction filter 485 interpolates the fused linear prediction coefficient for each pitch-cycle waveform in each segment entered from the fused aperiodic component unit input unit 482 for each sample, thereby calculating the linear prediction coefficients at the respective sample points and, using this linear prediction coefficients, filters the voice source waveforms generated by the voice source waveform generator 484, thereby generating the aperiodic components waveforms for one sentence or for one breath group.

(3) Advantages

As described above, according to the fifth embodiment, since inadequate overlapping and addition of the different aperiodic components among the units or the pitch-cycle waveforms do not occur, attenuation of the power of the aperiodic components and the deterioration of the speech quality due to the appearance of the unnatural periodicity are prevented.

Also, since the frequency characteristics of the aperiodic components may be changed smoothly by interpolating the linear coefficients per sample, the higher speech quality than the first embodiment is realized.

Sixth Embodiment

Referring to FIG. 17, the aperiodic component fusing unit 47 according to the sixth embodiment of the invention will be described.

(1) Summary of Aperiodic Component Fusing Unit 47

In the description of the aperiodic component fusing unit 47 in the first embodiment, the fusion of the linear prediction coefficients is carried out by a method of averaging the linear prediction coefficients obtained for each of the aperiodic component of each of the plurality of speech units by the line spectrum pair domain or the like.

In this method, although a preferably result is obtained when the spectrum characteristics represented by the linear prediction coefficients are relatively similar among the aperiodic components of the plurality of speech units, when the spectrum characteristics are significantly different among the aperiodic components to be fused, the meaning of the $i^{th}$ line spectrum pair coefficient differs among the aperiodic components. Therefore, there is a case in which the spectrum characteristics are lost as a result of averaging, and hence the fusion causes unnatural speech quality.

Accordingly, the fusing of the linear prediction coefficients by the aperiodic component fusing unit 47 in the sixth embodiment is carried out by obtaining the linear prediction coefficients having the spectrum characteristics common for the plurality of aperiodic component waveforms by carrying out the linear prediction analysis on a waveform produced by concatenating the plurality of aperiodic component waveforms.

(2) Aperiodic Component Fusing Unit 47

Figure 18:
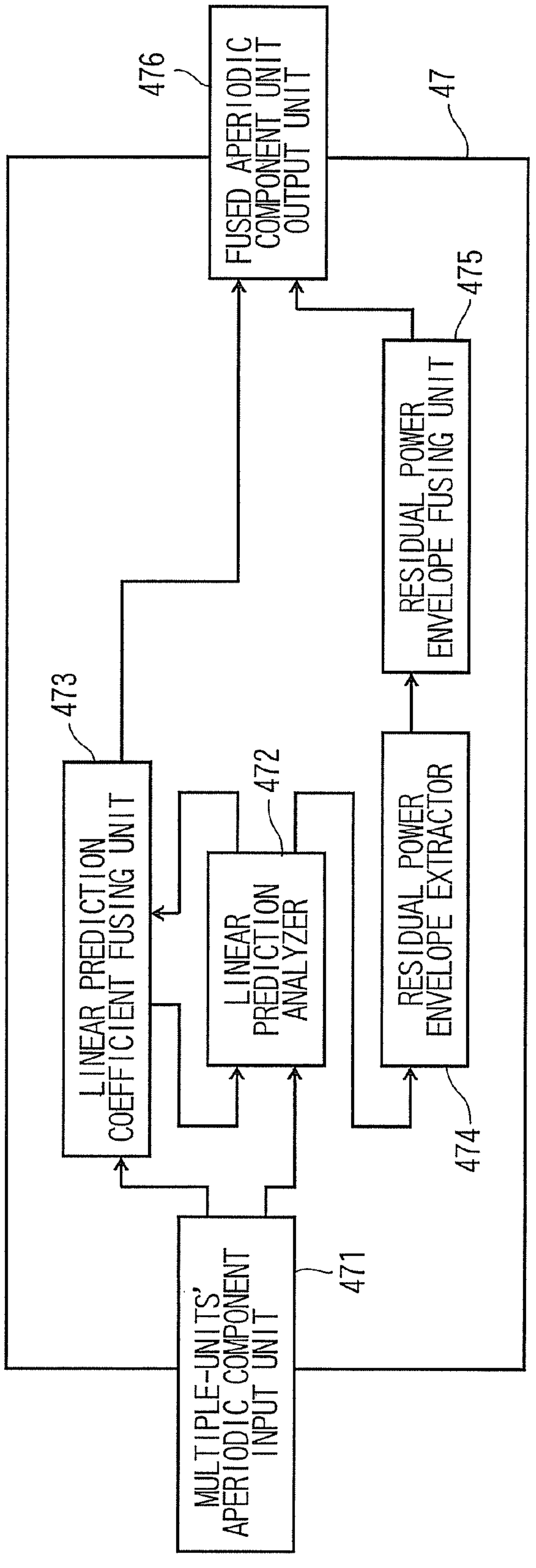
FIG. 18 is a block diagram showing a configuration of an aperiodic component fusing unit according to a sixth embodiment.

FIG. 18 is a block diagram showing a configuration of the aperiodic component fusing unit 47 according to the sixth embodiment. The difference of the configuration and the operation of the aperiodic component fusing unit 47 according to the sixth embodiment from those in the first embodiment will mainly be described using FIG. 18.

Although elements which constitute the aperiodic component fusing unit 47 according to the sixth embodiment are the same as the elements which constitute the aperiodic component fusing unit 47 in the first embodiment, the operation of the linear prediction coefficient fusing unit 473 and the relation of the processing unit with respect to the multiple-unit's aperiodic component input unit 471 and the linear prediction analyzer 472 are mainly different.

The multiple-unit's aperiodic component input unit 471, first of all, divides the respective aperiodic components of the plurality of speech units per entered segment into the unit to perform the linear prediction analysis and equalizes the number of units of analysis among the plurality of aperiodic components, and then outputs the waveforms of the respective units of analysis of the obtained plurality of aperiodic components to the linear prediction coefficient fusing unit 473 and the linear prediction analyzer 472.

The linear prediction analyzer 472 carries out the linear prediction analysis for each unit of analysis for each of the entered plurality of aperiodic components, and outputs the obtained linear prediction residual waveform per unit of analysis to the residual power envelope extractor 474. The method of obtaining the fused residual power envelopes by the residual power envelope extractor 474 and the residual power envelope fusing unit 475 are the same as in the first embodiment.

On the other hand, the linear prediction coefficient fusing unit 473 to which the waveform of the each unit of analysis of each of the plurality of aperiodic components are entered in parallel with the linear prediction analyzer 472 concatenates the waveforms from the plurality of aperiodic components per unit of analysis to produce one waveform, enters this waveform into the linear prediction analyzer 472 for the linear prediction analysis, so that the linear prediction coefficient is obtained. In other words, fusion of the linear prediction coefficients is carried out by obtaining the linear prediction coefficients having the spectrum characteristics common for the plurality of aperiodic component waveforms per unit of analysis.

(3) Advantages

As described above, according to the sixth embodiment, even when the spectrum characteristics are significantly different among the aperiodic components to be fused, relatively desirable fusion of the linear prediction coefficients is achieved, so that the higher speech quality than the first embodiment is realized.

Seventh Embodiment (1) Summary of Seventh Embodiment

Although the aperiodic components are assumed to be generated mainly by the noise-like voice source generated by friction of aspirated air flow at the vocal tract or the glottis in the method of fusing the aperiodic components according to the sixth embodiment, there may be actually a case in which the aperiodic components are generated by irregular pulsed voice source such as a plosive.

In the current status, the accuracy of the method of decomposing the speech waveform into the periodic components and the aperiodic components is not sufficient, and the periodic components may be mixed in the decomposed aperiodic components.

Therefore, there may be a case in which the pulsed component may be included into the linear prediction residual waveform extracted from the aperiodic component waveform, and hence when carrying out extraction of the residual power envelopes, then fusion of the residual power envelopes in this state and then generating the aperiodic components using the fused residual power envelopes thus obtained, there may arise cases where the aperiodic components around the moment when the pulsed components are included may become too large and hence becomes noisy, or where the aperiodic components generated by the pulsed voice source cannot be reproduced at the time of synthesis, and then the intelligibility of the plosive become deteriorated.

Therefore, the above-described problems are solved as follows in the seventh embodiment.

When fusing the aperiodic components, the aperiodic component fusing unit 47 removes the pulsed components in the linear prediction residual waveform before fusing the aperiodic components.

When generating the aperiodic components, the adder 48 generates the voice source waveform by modulating the amplitude of the white noise with the fused residual power envelopes and, only in the case of the plosive, rearrange the pulsed components removed by the aperiodic component fusing unit 47 on the voice source waveform.

(2) Aperiodic Component Fusing Unit 47

More specifically, removal of the pulsed components in the linear prediction residual waveform by the aperiodic component fusing unit 47 is carried out as a pre-processing in the residual power envelope extractor 474.

Here, detection of the pulsed components is carried out by obtaining the amplitude distribution of the given linear prediction residual waveform and then regarding the samples having a large amplitude excluded from this distribution as the pulsed components.

For example, for the linear prediction residual waveform in units of analysis, an average value and a standard deviation are calculated from the amplitude of the residuals around the center of the window from which the influence of the analysis window is removed, and the samples having the amplitudes excluded from "(average value±3×standard deviation)×amplitude of analysis window" are detected as the pulsed components. The amplitudes of the samples in the linear prediction residual waveform detected as the pulsed components are replaced by zero or the average value, and then the extraction of the residual power envelopes is carried out. The position and the amplitude of the detected pulsed components are retained as needed as in the case of the plosive.

(3) Adder 48

The rearrangement of the pulsed components to the voice source waveform by the adder 48 is carried out as a post-processing of the voice source waveform generator 484.

More specifically, the amplitude of the white noise is modulated with the fused residual power envelopes to generate the voice source waveform and, only in the case of the plosive, the amplitude at the corresponding position in the voice source waveform of the respective pulsed components retained in the residual power envelope extractor 474 is replaced by the amplitudes of the pulsed components.

(4) Advantages

As described above, according to the seventh embodiment, the problems such that part of the aperiodic components becomes too large due to the influence of the pulsed components, and hence becomes noisy, or the aperiodic components generated by the pulsed voice source cannot be reproduced at the time of synthesis, and then the intelligibility of the plosive deteriorates, are solved.

Modification

The invention is not limited exactly to the above-described embodiments, and the components may be modified and embodied without departing the scope of the invention in the stage of implementation.

It is also possible to form the invention in various modes by combining the plurality of components disclosed in the above-described embodiment as needed. For example, some components may be deleted from all the components shown in the embodiments and, furthermore, the components shown throughout some different embodiments may be combined as needed.

What is claimed is:

1. A speech processing apparatus for carrying out text-to-speech synthesis, comprising:

an input unit to which a plurality of segments obtained by delimiting a phonological sequence corresponding to a target speech in units of synthesis and prosodic information on the respective segments corresponding to the target speech are entered;

a unit selector configured to select a plurality of first speech units from a group of speech units on the basis of the prosodic information for each of the plurality of segments;

a decomposer configured to decompose each of the plurality of first speech units into periodic components and aperiodic components for each of the plurality of segments;

a periodic component fusing unit configured to generate a second speech unit by fusing the periodic components of the plurality of first speech units for each of the plurality of segments;

an aperiodic component fusing unit configured to generate a third speech unit by fusing the aperiodic components of the plurality of first speech units for each of the plurality of segments; and a generator configured to generate a synthesized speech by adding speech waveforms obtained respectively from the second speech unit and the third speech unit generated for each of the plurality of segments and concatenating the same among the segments.

2. The apparatus according to claim 1, wherein the generator includes:

an adder configured to generate a fourth speech unit by adding the second speech unit and the third speech unit for each of the plurality of segments; and a concatenator configured to generate the synthesized speech by concatenating the speech waveforms obtained from the fourth speech units among the segments.

3. The apparatus according to claim 1, wherein the generator includes:

a first concatenator configured to concatenate the speech waveforms obtained from the second speech units among the segments to generate the speech waveform of the periodic, components;

a second concatenator configured to concatenate the speech waveforms obtained from the third speech units among the segments to generate the speech waveform of the aperiodic components; and an adder configured to add the periodic component waveform and the aperiodic component waveform to generate the synthesized waveform.

4. The apparatus according to claim 1, wherein the aperiodic component fusing unit includes:

a first generator configured to generate a set of fused spectrum parameters which represents spectrum characteristics of the plurality of aperiodic components of first speech units for each of the plurality of segments;

a second generator configured to generate a fused power envelope which represents the temporal change of the power of the plurality of aperiodic components; and an output unit configured to output the set of fused spectrum parameters and the fused power envelope as the third speech unit, and wherein the generator generates the speech waveform of the third speech unit from the set of fused spectrum parameters and the fused power envelope, and adds the speech waveform with the one obtained from the second speech unit for each of the plurality of segments.

5. The apparatus according to claim 1, wherein the aperiodic component fusing unit includes:

an analyzer configured to carry out linear prediction analysis for the aperiodic component waveforms of the plurality of first speech units and obtain a first set of linear prediction coefficients and a first linear prediction residual waveform respectively for each of the plurality of segments;

a first fusing unit configured to fuse the plurality of first sets of linear prediction coefficients and generate a second set of linear prediction coefficients;

a first extractor configured to extract a residual power envelope indicating the temporal change of the power of the respective first linear prediction residual waveform for each of the plurality of first linear prediction residual waveforms;

a second extractor configured to fuse the plurality of residual power envelopes to generate a second residual power envelope; and an output unit configured to output the second set of linear prediction coefficients and the second residual power envelope as the third speech unit, and wherein the generator generates the speech waveform of the third speech unit using the second set of linear prediction coefficients and the second residual power envelope.

6. The apparatus according to claim 1, wherein the aperiodic component fusing unit includes:

an analyzer configured to carry out linear prediction analysis for the aperiodic component waveforms of the plurality of first speech units and obtain a first set of linear prediction coefficients and a first linear prediction residual waveform respectively for each of the plurality of segments;

a second fusing unit configured to carry out the linear prediction analysis on the second aperiodic component waveform obtained by concatenating the aperiodic component waveforms of the plurality of first speech units to generate the second set of linear prediction coefficients;

a third extractor configured to extract the residual power envelope indicating the temporal change of the power of the respective first linear prediction residual waveform for each of the plurality of first linear prediction residual waveforms;

a fourth extractor configured to fuse the plurality of residual power envelopes to generate a second residual power envelope; and an output unit configured to output the second set of linear prediction coefficients and the second residual power envelope as information relating to the third speech unit, and wherein the generator generates the speech waveform of the third speech waveform using the second set of linear prediction coefficients and the second residual power envelope.

7. A speech processing apparatus for carrying out text-to-speech synthesis, comprising:

an input unit to which a plurality of segments obtained by delimiting a phonological sequence corresponding to a target speech in units of synthesis and prosodic information on the respective segments corresponding to the target speech are entered;

an environment storage configured to store speech-units' environments of a plurality of speech units;

a unit storage configured to store periodic components and aperiodic components of each of the speech units, (which were decomposed from the waveform data of each of the speech units);

an environment selector configured to select the unit environments of a plurality of first speech units from the environment storage on the basis of the prosodic information for each of the plurality of segments;

a periodic component fusing unit configured to extract the periodic components of the first speech units corresponding to the selected unit environments of the plurality of first speech units from the unit storage and fuse the periodic components to generate the second speech unit for each of the plurality of segments;

an aperiodic component fusing unit configured to extract the aperiodic components of the first speech units corresponding to the unit environments of the plurality of first speech units from the unit storage and fuse the aperiodic components to generate a third speech unit for each of the plurality of segments; and a generator configured to generate a synthesized speech by adding speech waveforms obtained respectively from the second speech units and the third speech units of the plurality of segments and concatenating the same among the segments.

8. The apparatus according to claim 7, wherein the unit environment of the first speech units selected by the environment storage is the same or different between the periodic components and the aperiodic components.

9. The apparatus according to claim 7, wherein the generator includes:

an adder configured to generate the fourth speech unit by adding the second speech unit and the third speech unit for each of the plurality of segments; and a concatenator configured to generate the synthesized speech by concatenating the speech waveforms obtained from the fourth speech units among the segments.

10. The apparatus according to claim 7, wherein the generator includes:

a first concatenator configured to concatenate the speech waveforms obtained from the second speech units among the segments to generate the speech waveform of the periodic components;

a second concatenator configured to concatenate the speech waveforms obtained from the third speech units among the segments to generate the speech waveform of the aperiodic components; and an adder configured to add the periodic component waveform and the aperiodic component waveform to generate the synthesized waveform.

11. The apparatus according to claim 7, wherein the aperiodic component fusing unit includes:

a first generator configured to generate a set of fused spectrum parameters which represents spectrum characteristics of the plurality of aperiodic components of first speech units for each of the plurality of segments;

a second generator configured to generate a fused power envelope which represents the temporal change of the powers of the plurality of aperiodic components; and an output unit configured to output the set of fused spectrum parameters and the fused power envelope as the third speech unit, and wherein the generator generates the speech waveform of the third speech unit from the set of fused spectrum parameters and the fused power envelope, and adds the speech waveform with the one obtained from the second speech unit for each of the plurality of segments.

12. The apparatus according to claim 7, wherein the aperiodic component fusing unit includes:

an analyzer configured to carry out linear prediction analysis for the aperiodic component waveforms of the plurality of first speech units and obtain a first set of linear prediction coefficients and a first linear prediction residual waveform respectively for each of the plurality of segments;

a first fusing unit configured to fuse the plurality of first sets of linear prediction coefficients and generate a second set of linear prediction coefficients;

a first extractor configured to extract a residual power envelope indicating the temporal change of the power of the respective first linear prediction residual waveform for each of the plurality of first linear prediction residual waveforms;

a second extractor configured to fuse the plurality of residual power envelopes to generate a second residual power envelope; and an output unit configured to output the second set of linear prediction coefficients and the second residual power envelope as the third speech unit, and wherein the generator generates the speech waveform of the third speech unit using the second set of linear prediction coefficients and the second residual power envelope.

13. The apparatus according to claim 7, wherein the aperiodic component fusing unit includes:

an analyzer configured to carry out linear prediction analysis for the aperiodic component waveforms of the plurality of first speech units and obtain a first set of linear prediction coefficients and a first linear prediction residual waveform respectively for each of the plurality of segments;

a second fusing unit configured to carry out the linear prediction analysis on the second aperiodic component waveform obtained by concatenating the aperiodic component waveforms of the plurality of first speech units to generate the second set of linear prediction coefficients;

a third extractor configured to extract the residual power envelope indicating the temporal change of the power of the respective first linear prediction residual waveform for each of the plurality of first linear prediction residual waveform;

a fourth extractor configured to fuse the plurality of residual power envelopes to generate a second residual power envelope; and an output unit configured to output the second set of linear prediction coefficients and the second residual power envelope as information relating to the third speech unit, and wherein the generator generates the speech waveform of the third speech waveform using the second set of linear prediction coefficients and the second residual power envelope.

14. A speech processing apparatus for creating a storage for storing a plurality of speech units used for text-to-speech synthesis comprising:

an input unit to which a plurality of segments obtained by delimiting a phonological sequence corresponding to a target speech in units of synthesis and prosodic information on the respective segments corresponding to the target speech are entered;

a unit selector configured to select a plurality of first speech units from a group of the speech units on the basis of the prosodic information for each of the plurality of segments;

a decomposer configured to decompose each of the plurality of first speech units into periodic components and aperiodic components for each of the plurality of segments;

a periodic component fusing unit configured to generate a second speech unit by fusing the periodic components of the plurality of first speech units for each of the plurality of segments;

an aperiodic component fusing unit configured to generate a third speech unit by fusing the aperiodic components of the plurality of first speech units for each of the plurality of segments; and the storage configured to store the plurality of second speech units and the plurality of third speech units.

15. The apparatus according to claim 14, wherein the storage extracts and stores the second speech units and the third speech units of a specified amount from the plurality of second speech units and the plurality of third speech units on the basis of the frequency of appearance of the speech units or the quantity of characteristics of the speech units.

16. A speech processing apparatus for creating a storage configured to store a plurality of speech units used for text-to-speech synthesis comprising:

a unit storage configured to store periodic components and aperiodic components of each of the speech units, (which were decomposed from the waveform data of each of the speech units);

an input unit to which a plurality of segments obtained by delimiting a phonological sequence corresponding to a target speech in units of synthesis and prosodic information on the respective segments corresponding to the target speech are entered;

a component selector configured to select the periodic components and the aperiodic components of the plurality of first speech units from the unit storage on the basis of the prosodic information for each of the plurality of segments;

a periodic component fusing unit configured to generate a second speech unit by fusing the periodic components of the plurality of first speech units for each of the plurality of segments;

an aperiodic component fusing unit configured to generate a third speech unit by fusing the aperiodic components of the plurality of first speech units for each of the plurality of segments; and the storage configured to store the plurality of second speech units and the plurality of third speech units.

17. The apparatus according to claim 16, wherein the storage extracts and stores the second speech units and the third speech units of a specified amount from the plurality of second speech units and the plurality of third speech units on the basis of the frequency of appearance of the speech units or the quantity of characteristics of the speech units.

18. A speech processing program product configured to carry out text-to-speech synthesis and stored in a non-transitory computer readable medium, a computer realizing the functions of:

accepting a plurality of segments obtained by delimiting a phonological sequence corresponding to a target speech in units of synthesis and prosodic information on the respective segments corresponding to the target speech;

selecting a plurality of first speech units from a group of speech units on the basis of the prosodic information for each of the plurality of segments;

decomposing each of the plurality of first speech units into periodic components and aperiodic components for each of the plurality of segments;

generating a second speech unit by fusing the periodic components of the plurality of first speech units for each of the plurality of segments;

generating a third speech unit by fusing the aperiodic components of the plurality of first speech units for each of the plurality of segments; and generating a synthesized speech by adding speech waveform obtained respectively from the second speech unit and the third speech unit generated for each of the plurality of segments and concatenating the same among the segments.

19. A speech processing program product configured to carry out text-to-speech synthesis and stored in a non-transitory computer readable medium, a computer comprising:

an environment storage configured to store unit environments of a plurality of speech units;

a unit storage configured to store periodic components and aperiodic components of each of the speech units (which were decomposed from the waveform data of each of the speech units);

the computer realizing the functions of:

accepting a plurality of segments obtained by delimiting a phonological sequence corresponding to a target speech in units of synthesis and prosodic information on the respective segments corresponding to the target speech;

selecting the unit environments of a plurality of first speech units from the environment storage on the basis of the prosodic information for each of the plurality of segments;

extracting the periodic components of the first speech units corresponding to the selected unit environments of the plurality of first speech units from the unit storage and fusing the periodic components individually to generate the second speech unit for each of the plurality of segments;

extracting the aperiodic components of the first speech units corresponding to the selected unit environments of the plurality of first speech units from the unit storage and fusing the aperiodic components individually to generate third speech unit for each of the plurality of segments; and generating a synthesized speech by adding speech waveform obtained respectively from the second speech unit and the third speech unit for each of the plurality of segments and concatenating the same among the segments.

20. A speech processing program product for creating a storage configured to store a plurality of speech units used for text-to-speech synthesis stored in a non-transitory computer readable medium, a computer realizing the functions of:

accepting a plurality of segments obtained by delimiting a phonological sequence corresponding to a target speech in units of synthesis and prosodic information on the respective, segments corresponding to the target speech;

selecting a plurality of first speech units from a group of the speech units on the basis of the prosodic information for each of the plurality of segments;

decomposing each of the plurality of first speech units into periodic components and aperiodic components for each of the plurality of segments;

generating a second speech unit by fusing the periodic components of the plurality of first speech units for each of the plurality of segments;

generating a third speech unit by fusing the aperiodic components of the plurality of first speech units for each of the plurality of segments; and storing the plurality of second speech units and the plurality of third speech units in the storage.

21. A speech processing program product for creating a storage configured to store a plurality of speech units used for text-to-speech synthesis stored in a non-transitory computer readable medium, a computer comprising:

a unit storage configured to store periodic components and aperiodic components of each of the plurality of speech units, (which were decomposed from the waveform data of each of the speech units);

the computer realizing the functions of:

accepting a plurality of segments obtained by delimiting a phonological sequence corresponding to a target speech in units of synthesis and prosodic information on the respective segments corresponding to the target speech;

selecting the periodic components and the aperiodic components of the plurality of first speech units from the unit storage on the basis of the prosodic information for each of the plurality of segments;

generating a second speech unit by fusing the periodic components of the plurality of first speech units for each of the plurality of segments;

generating a third speech unit by fusing the aperiodic components of the plurality of first speech units for each of the plurality of segments; and storing the plurality of second speech units and the plurality of third speech units in the storage.

* * * * *